(12) United States Patent
Hodel

(10) Patent No.: US 12,250,898 B2
(45) Date of Patent: Mar. 18, 2025

(54) AGRICULTURAL TRENCH DEPTH SENSING SYSTEMS, METHODS, AND APPARATUS

(71) Applicant: Precision Planting LLC, Tremont, IL (US)

(72) Inventor: Jeremy Hodel, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 278 days.

(21) Appl. No.: 17/818,032

(22) Filed: Aug. 8, 2022

(65) Prior Publication Data

US 2022/0377960 A1    Dec. 1, 2022

Related U.S. Application Data

(60) Division of application No. 16/254,247, filed on Jan. 22, 2019, now Pat. No. 11,516,959, which is a continuation of application No. PCT/US2017/043565, filed on Jul. 24, 2017.

(60) Provisional application No. 62/491,707, filed on Apr. 28, 2017, provisional application No. 62/365,585, filed on Jul. 22, 2016.

(51) Int. Cl.
| | |
|---|---|
| A01C 7/20 | (2006.01) |
| A01B 47/00 | (2006.01) |
| A01B 63/16 | (2006.01) |
| A01B 79/02 | (2006.01) |
| A01C 5/06 | (2006.01) |
| G01B 7/26 | (2006.01) |
| G01B 17/00 | (2006.01) |
| G01D 5/14 | (2006.01) |
| G01P 15/18 | (2013.01) |

(52) U.S. Cl.
CPC .............. *A01C 7/203* (2013.01); *A01B 47/00* (2013.01); *A01B 63/16* (2013.01); *A01B 79/02* (2013.01); *A01C 5/064* (2013.01); *A01C 5/068* (2013.01); *G01B 7/26* (2013.01); *G01B 17/00* (2013.01); *G01D 5/145* (2013.01); *G01P 15/18* (2013.01)

(58) Field of Classification Search
CPC ..................................................... A01C 7/203
See application file for complete search history.

(56) References Cited

U.S. PATENT DOCUMENTS

| | | | | |
|---|---|---|---|---|
| 4,413,685 A | * | 11/1983 | Gremelspacher | A01B 63/22 111/926 |
| 4,878,543 A | * | 11/1989 | Kauss | A01B 63/114 172/3 |
| 10,308,116 B2 | * | 6/2019 | Czapka | A01C 7/102 |

(Continued)

*Primary Examiner* — Alicia Torres

(57) ABSTRACT

An agricultural implement including an implement frame, a trench opener, a gauge wheel arm and a depth adjustment assembly. A depth adjustment body is disposed between the depth adjustment assembly and the gauge wheel arm. An accelerometer is disposed on at least one of the depth adjustment assembly, the gauge wheel arm and the depth adjustment body and is configured to detect a position thereof. The accelerometer is disposed such that none of the x-axis, y-axis and z-axis of the accelerometer are perpendicular to the soil surface across the entire range of motion of the depth adjustment assembly, the gauge wheel arm or depth adjustment body to which the accelerometer is attached.

8 Claims, 26 Drawing Sheets

(56) References Cited

U.S. PATENT DOCUMENTS 10,555,454 B2 * 2/2020 Garner .................. A01C 7/205
2019/0059209 A1 * 2/2019 Brune .................... G01N 33/24

* cited by examiner

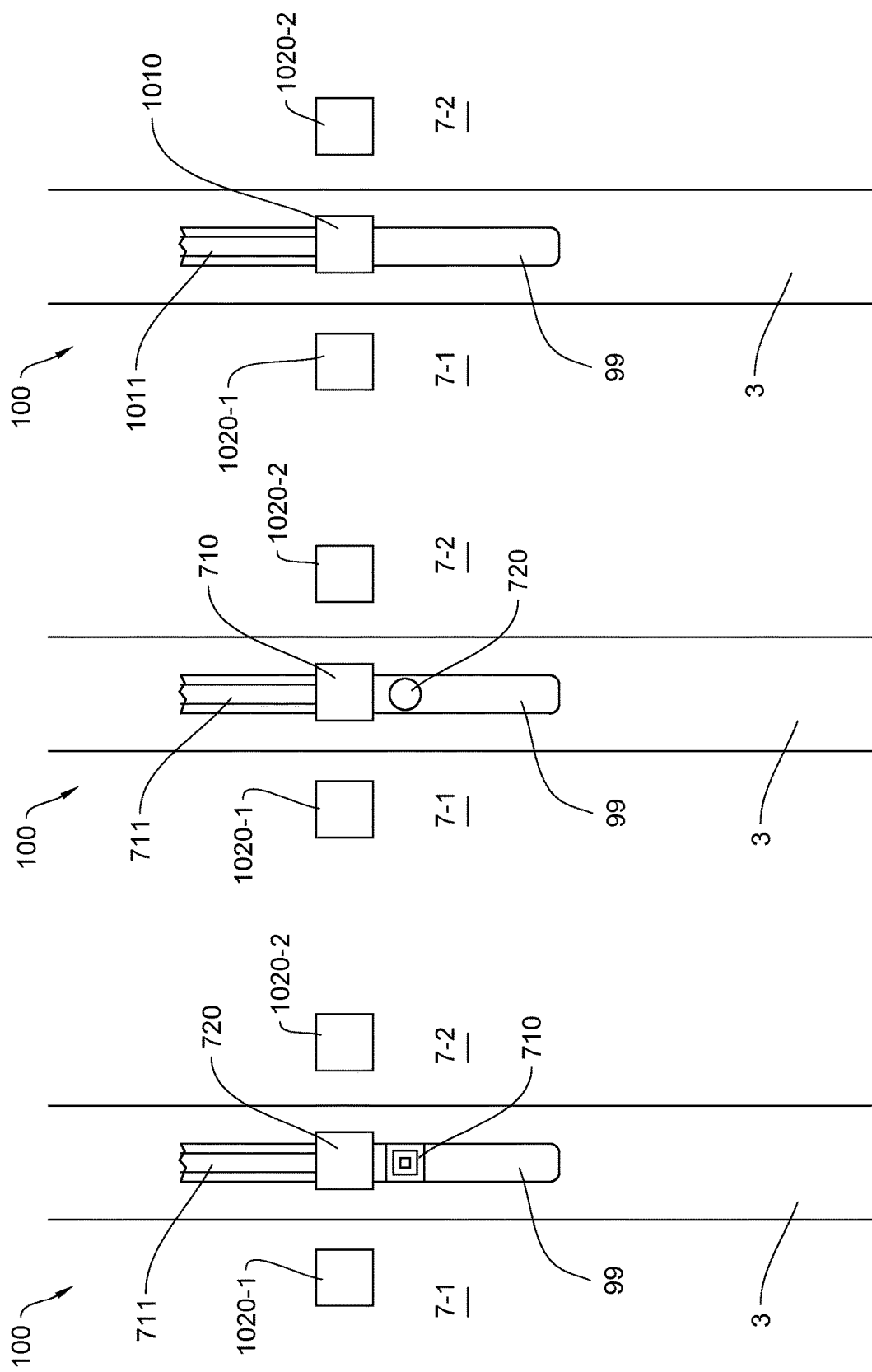

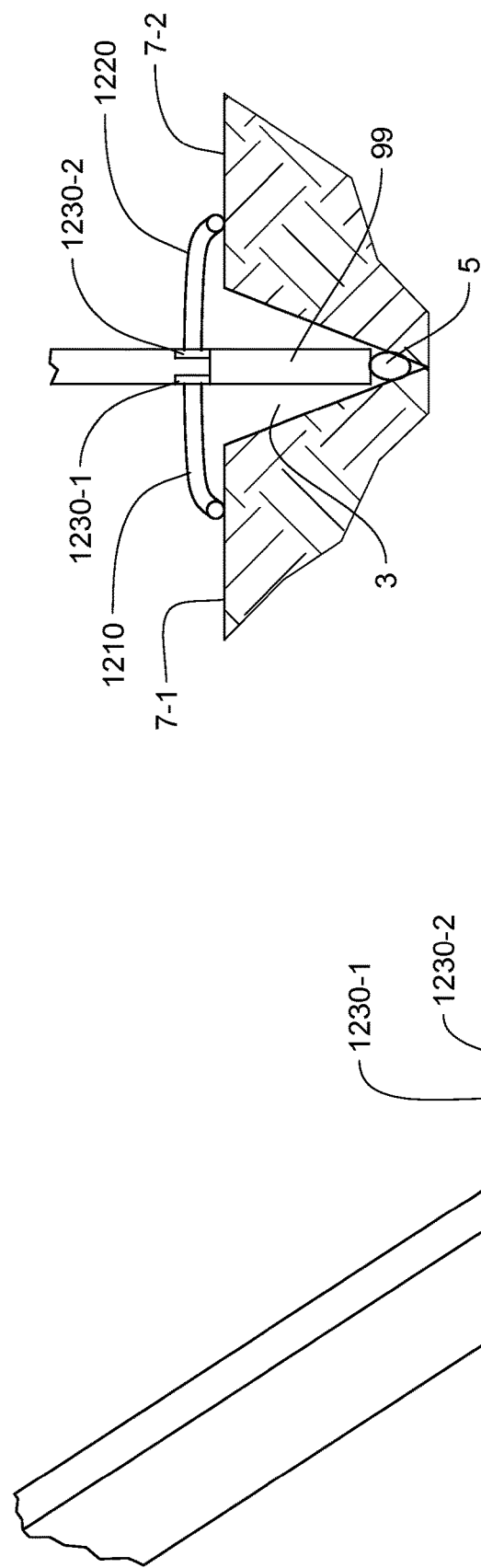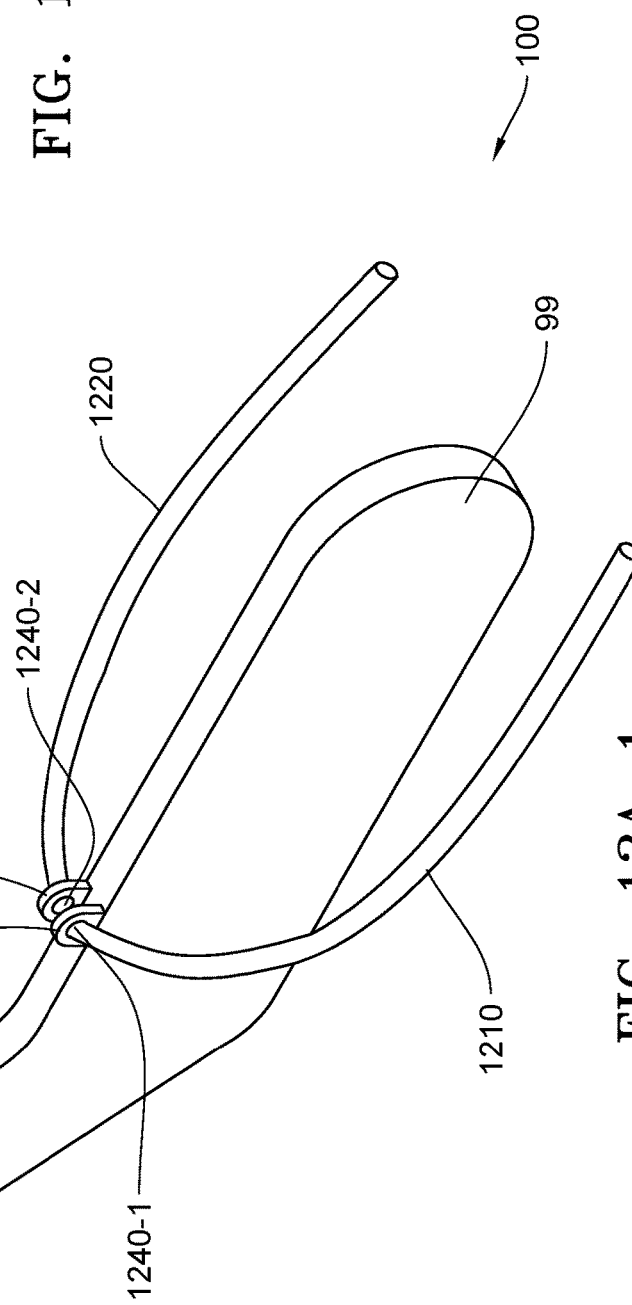
FIG. 12A-2
FIG. 12A-1

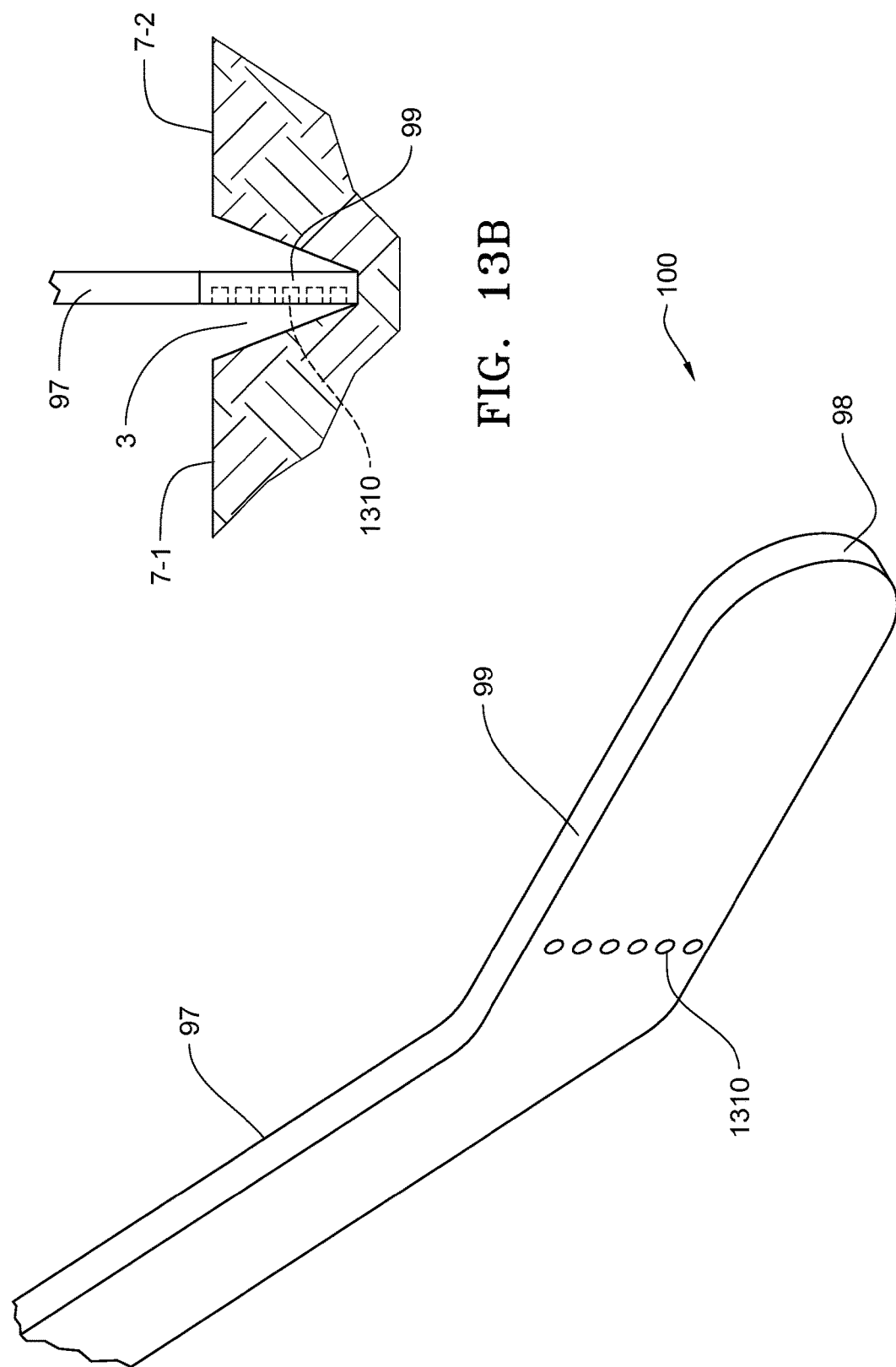

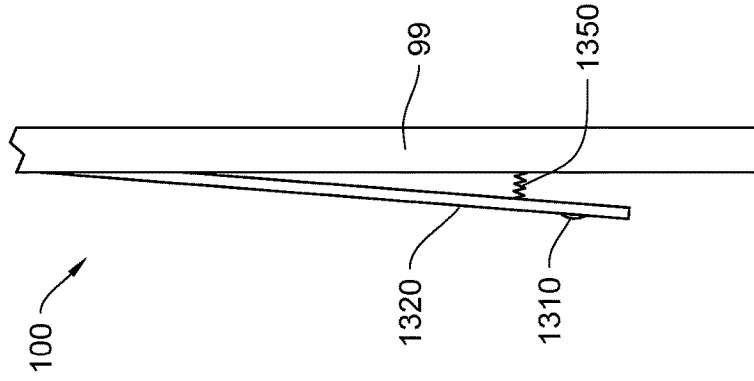
FIG. 13D (Top View)
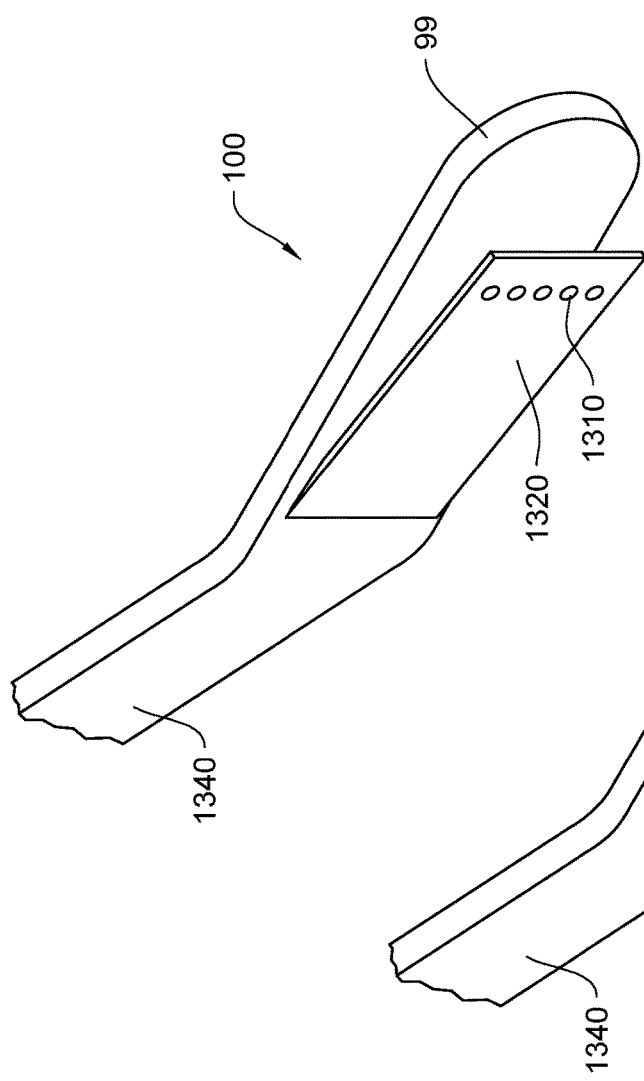
FIG. 13C
FIG. 13E

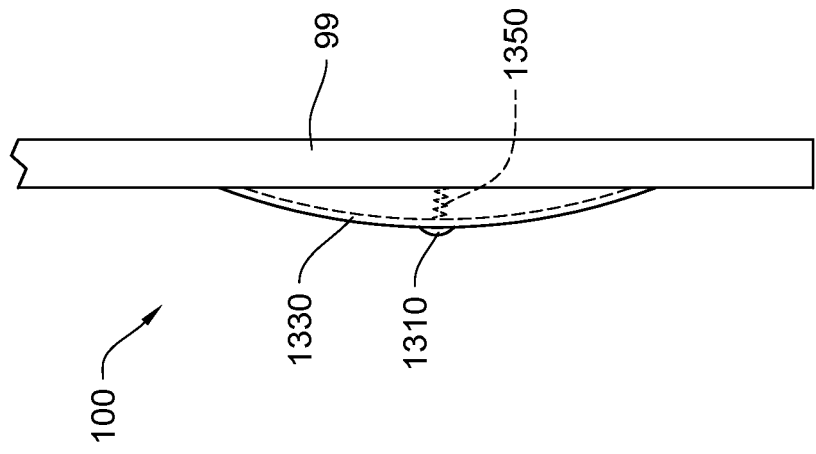
FIG. 13G (Top View)
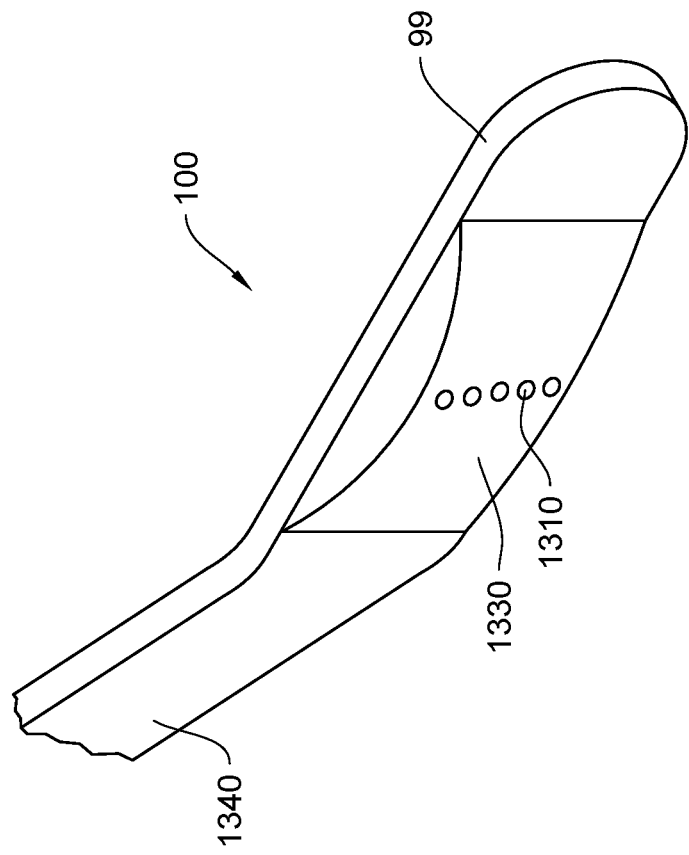
FIG. 13F

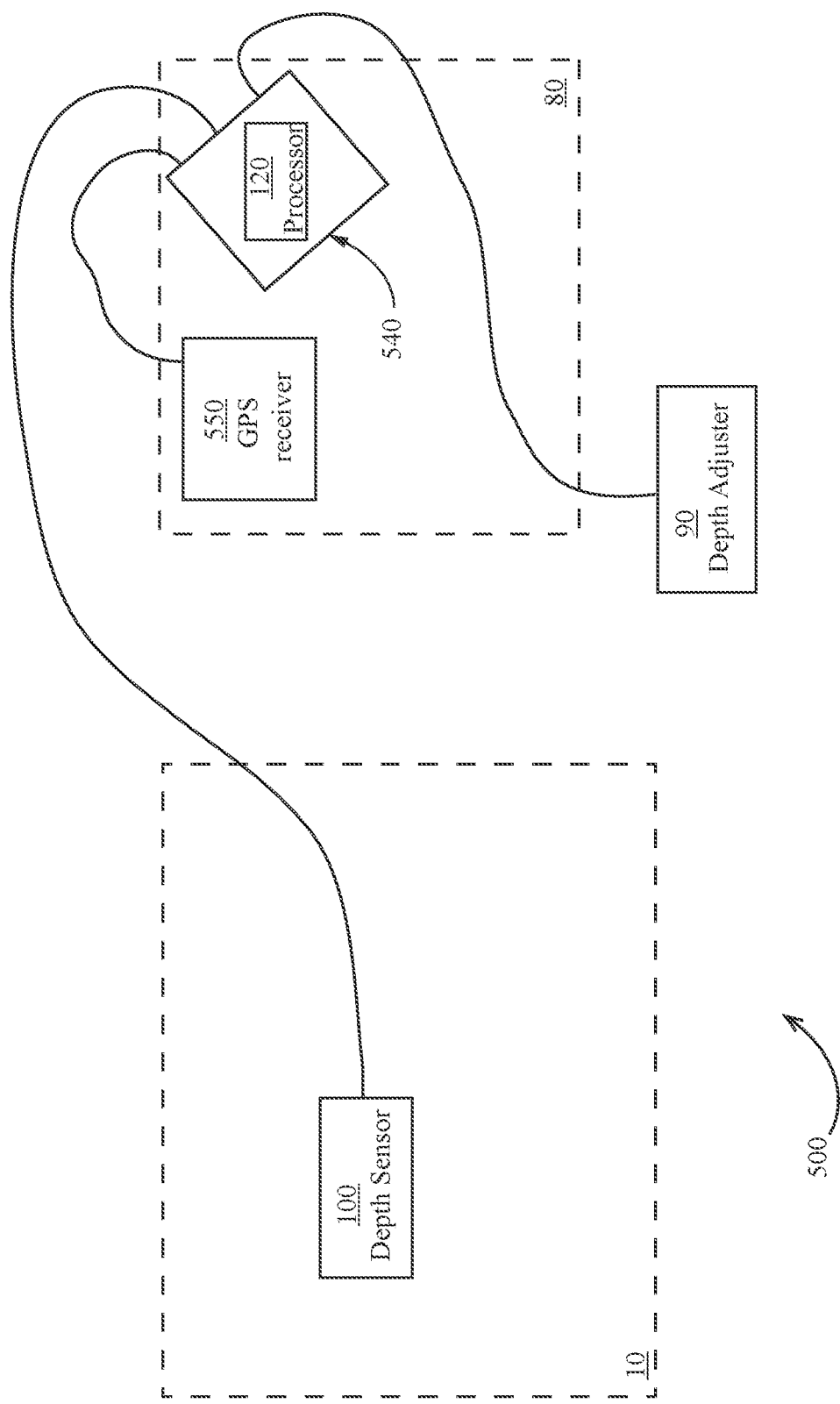

AGRICULTURAL TRENCH DEPTH SENSING SYSTEMS, METHODS, AND APPARATUS

CROSS-REFERENCE TO RELATED APPLICATIONS

This application is a divisional application of U.S. application Ser. No. 16/254,247, filed 22 Jan. 2019, which is a continuation of International Application No. PCT/US2017/043565, filed 24 Jul. 2017, which claims the benefit of U.S. Provisional Application No. 62/365,585 filed Jul. 22, 2016, and U.S. Provisional Application No. 62/491,707, filed Apr. 28, 2017, all of which are incorporated herein in their entireties by reference.

BACKGROUND

In recent years, farmers have recognized the need to select and maintain the proper planting depth to ensure the proper seed environment (e.g., temperature and moisture) and seedling emergence. To improve agronomic practices, it would also be desirable for the farmer to understand the relationship between actual planting depth and metrics such as emergence and yield. Conventional agricultural planters include only apparatus for adjusting a maximum planting depth, which may not be maintained during operation due to soil conditions or insufficient downpressure on the planter row unit. Disclosed in U.S. Patent Publication Number US2015/0289438 is a depth sensor with a pivot arm having left and right ground engaging fingers, wherein the pivot arm is pivotably connected to an angular displacement sensor mounted to a bracket on a row unit or to a seed firmer. The ground engaging fingers engage the soil surface on either side of the seed trench. As the depth of the seed trench changes, the pivot arm rotates causing a signal change in the angular displacement sensor. While this system provides a good measurement, it is desirable to increase the accuracy and/or durability of the system.

BRIEF DESCRIPTION OF THE DRAWINGS

FIGS. 10A-10C are top plan views showing different embodiments of seed firmers with ultrasonic sensors.

FIG. 12A-1 is a perspective view of a seed firmer with a first embodiment of finger sensor.

FIG. 12A-2 is an elevation view of the seed firmer of FIG. 12A-1 shown in a seed trench with the finger sensors disposed on each side of the seed trench.

FIG. 13A is a perspective view of an embodiment of a seed firmer with side sensors.

FIG. 13B is an elevation view of the seed firmer of FIG. 13A shown in a seed trench.

FIG. 13C is a perspective view of an embodiment of a seed firmer with side sensors disposed in a wall that is biased toward a sidewall of a seed trench.

FIG. 13D is a top plan view of the seed firmer embodiment of FIG. 13C.

FIG. 13E is a perspective view of another embodiment of a seed firmer with side sensors similar to FIG. 13C but with the wall attach to the bottom of the seed firmer.

FIG. 13F is a perspective view of another embodiment of a seed firmer with side sensors disposed in a convex wall that is biased toward a sidewall of a seed trench.

FIG. 13G is a top plan view of the seed firmer embodiment of FIG. 13F.

FIG. 14 schematically illustrates an embodiment of a depth sensor system installed on a tractor and planter.

DETAILED DESCRIPTION

Figure 1:
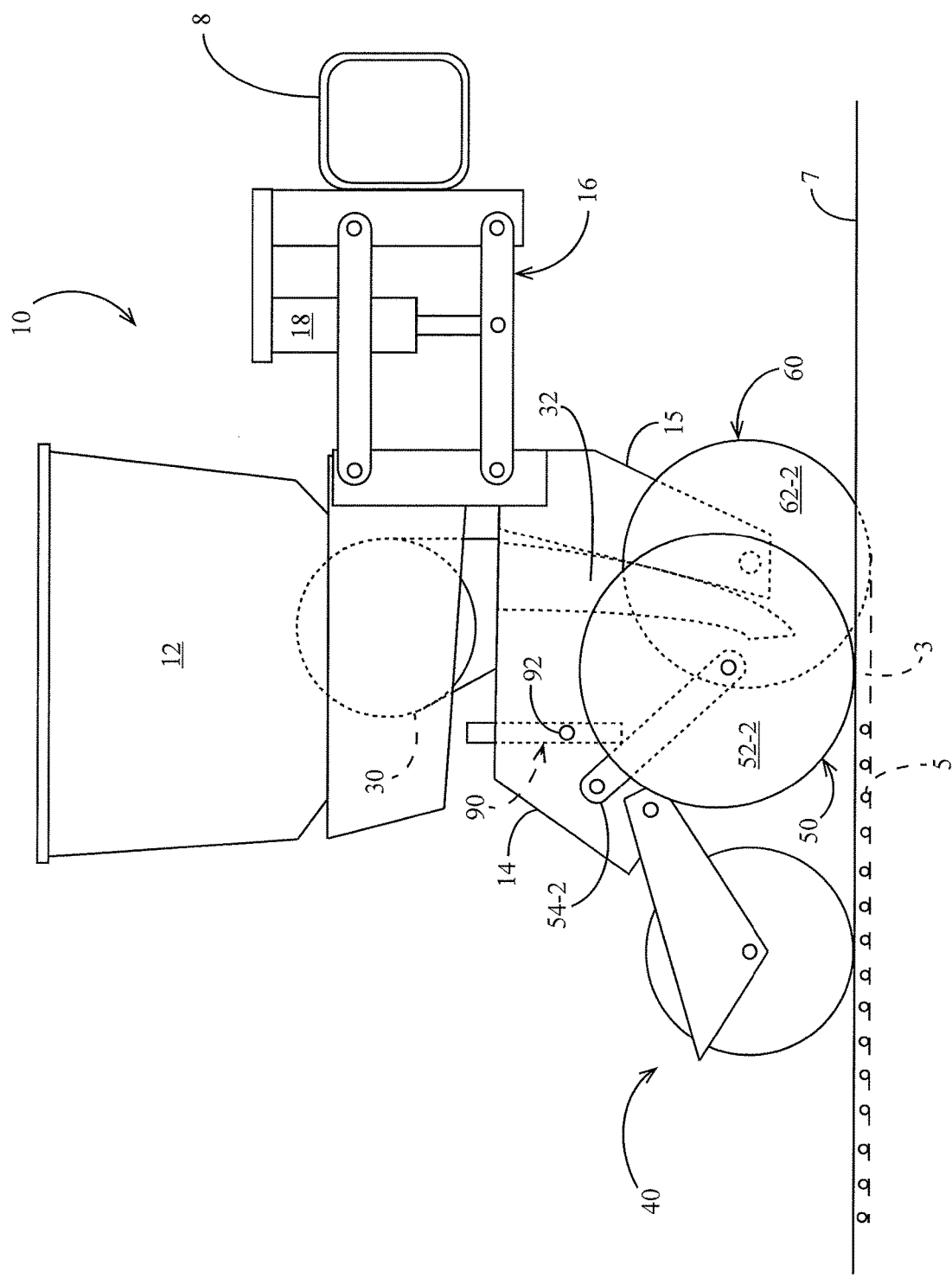
FIG. 1 is a right side elevation view of an embodiment of an agricultural row unit.
Figure 2:
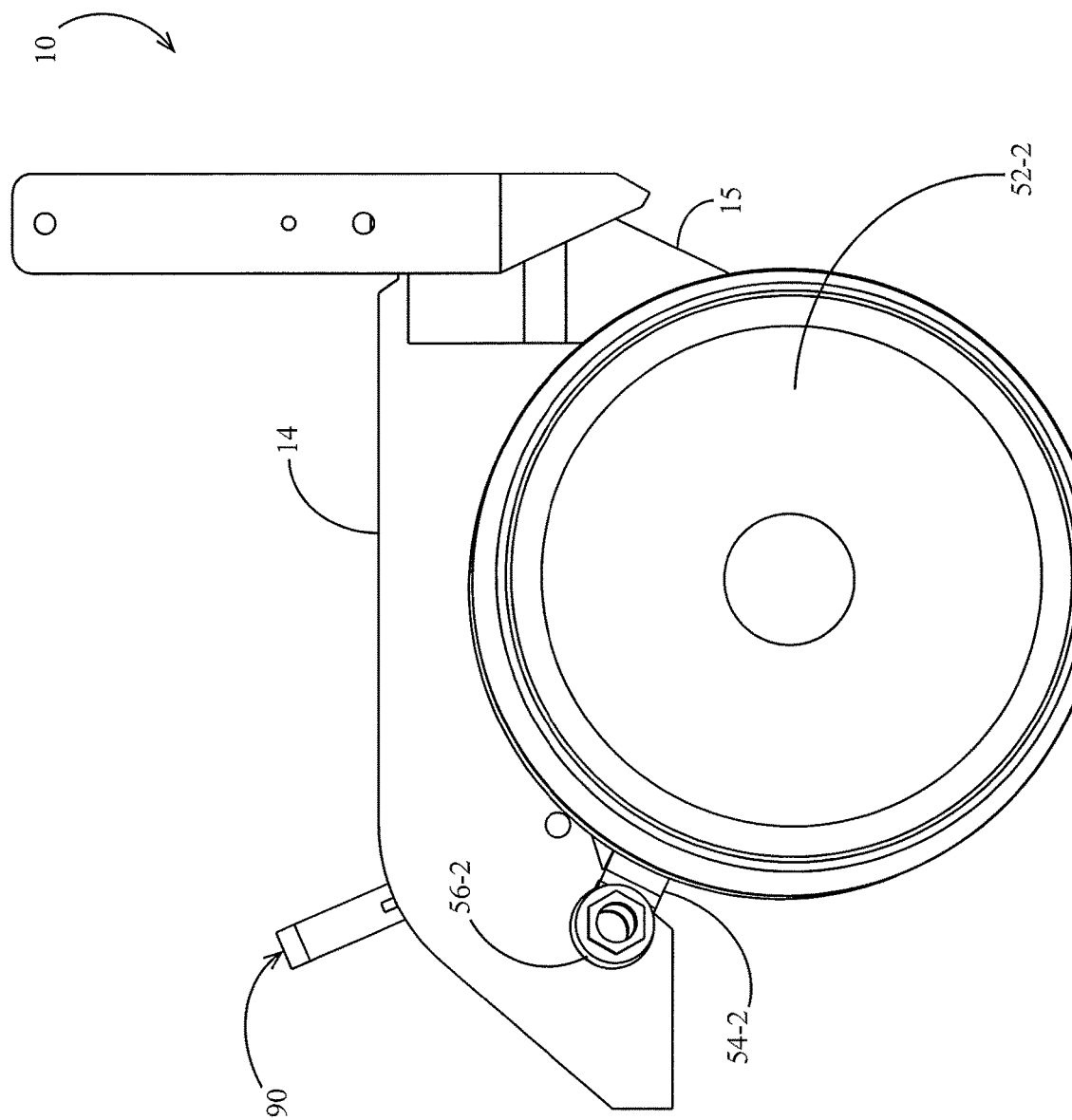
FIG. 2 is a right side elevation view of another embodiment of an agricultural row unit with certain components removed for clarity.
Figure 3:
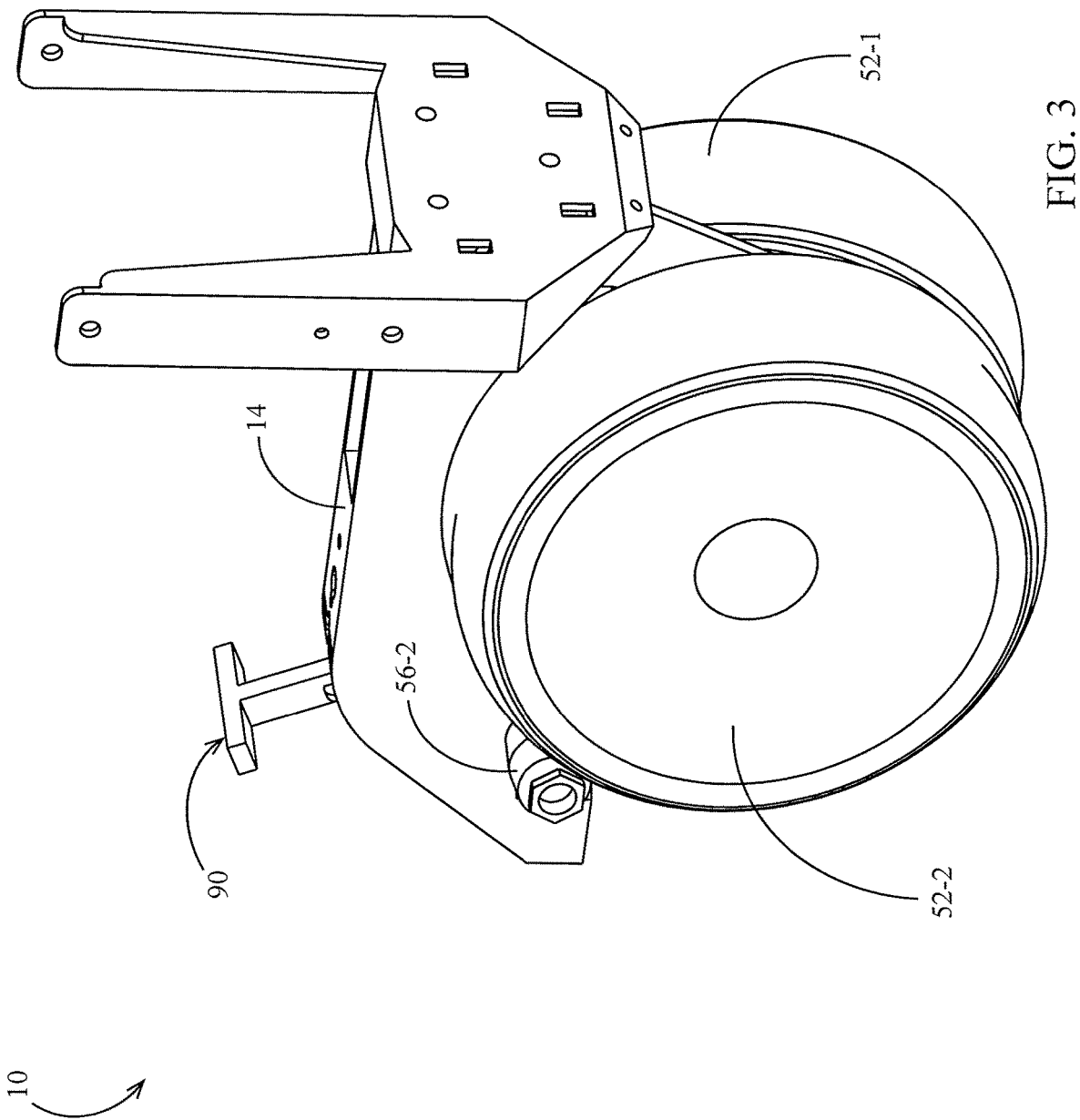
FIG. 3 is a perspective view of the agricultural row unit of FIG. 2.
Figure 4:
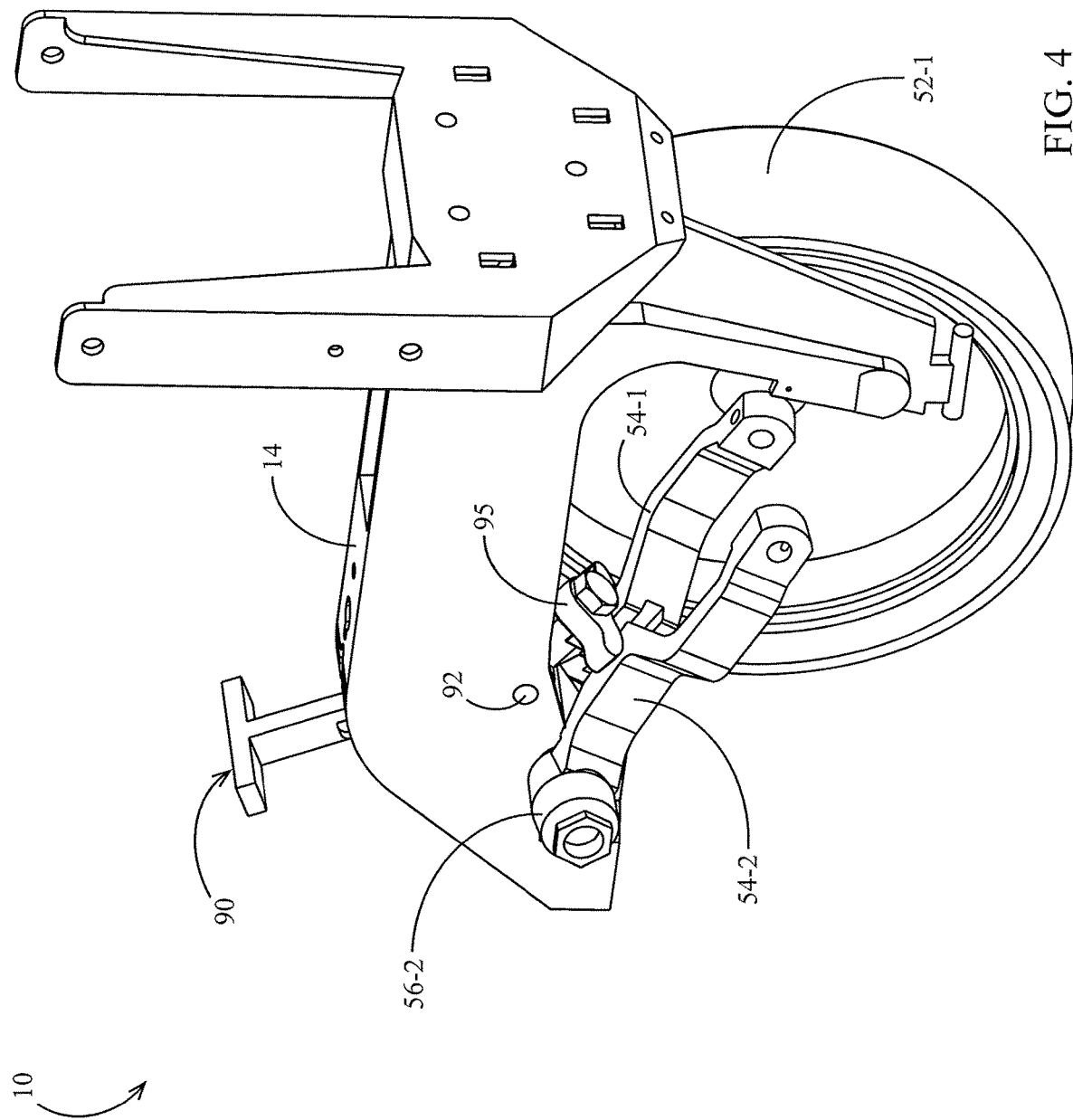
FIG. 4 is a perspective view of the agricultural row unit of FIG. 2 with a right gauge wheel removed for clarity.
Figure 5:
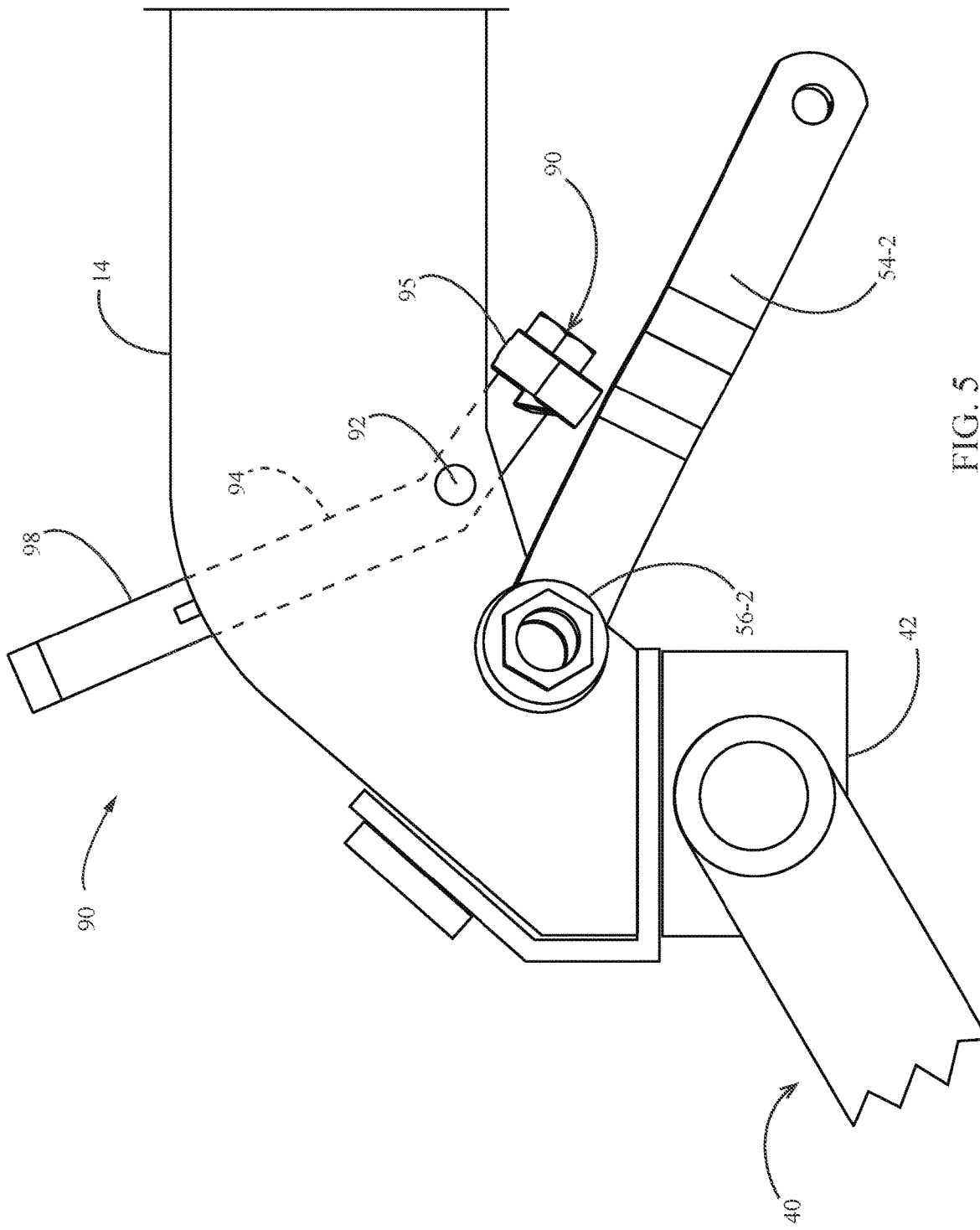
FIG. 5 is an enlarged partial right side elevation view of the agricultural row unit of FIG. 2.
Figure 6:
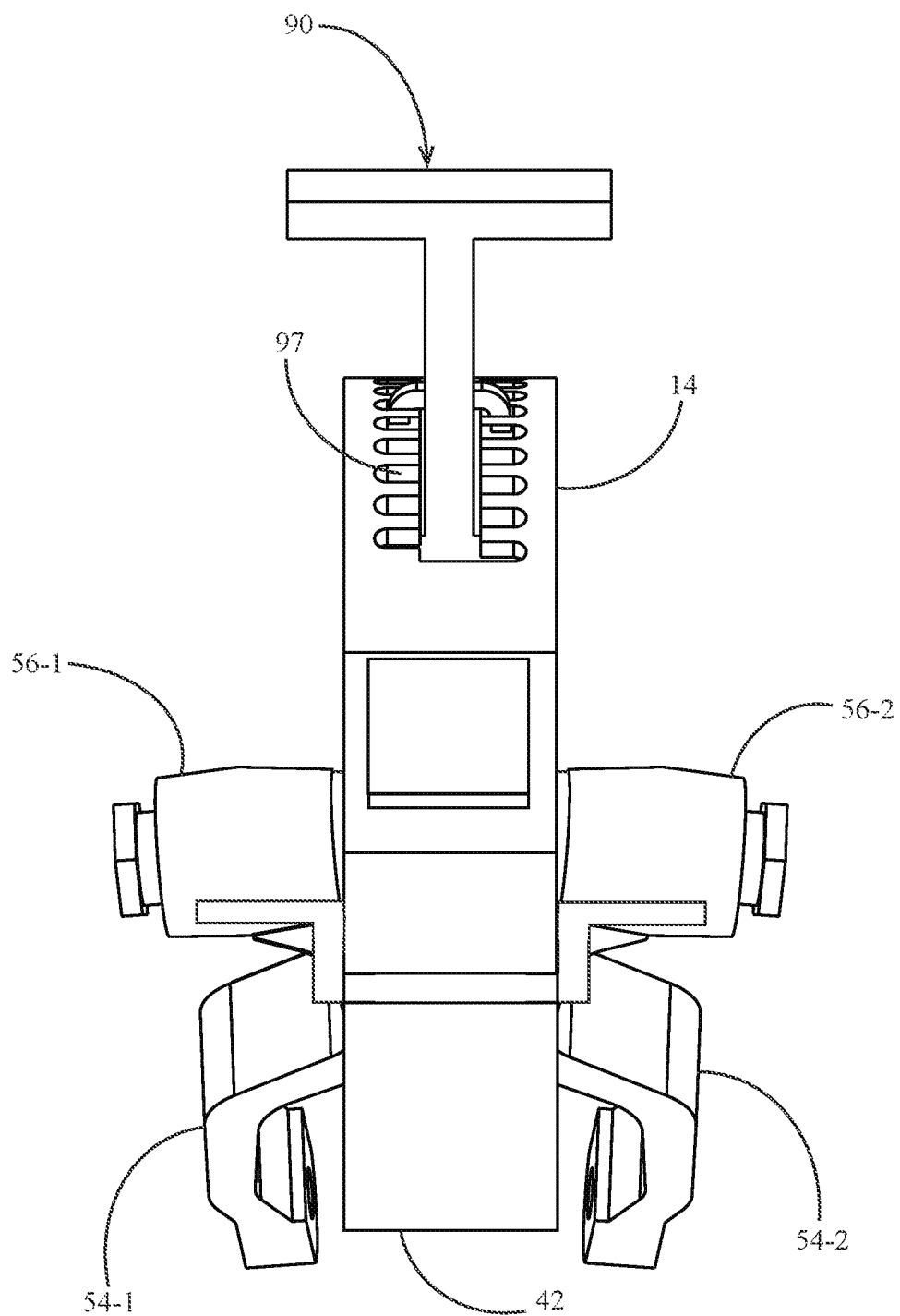
FIG. 6 is a rear elevation view of the agricultural row unit of FIG. 5.

Referring to the drawings, wherein like reference numerals designate identical or corresponding parts throughout the several views, FIG. 1 illustrates an embodiment of an agricultural implement, e.g., a planter, comprising a toolbar 8 to which multiple row units 10 are mounted in transversely spaced relation. In the embodiment shown, each row unit 10 is mounted to the toolbar by a parallel arm arrangement 16 such that the row unit is permitted to translate vertically with respect to the toolbar. An actuator 18 is pivotally mounted to the toolbar 8 and the parallel arm arrangement 16 and is configured to apply supplemental downpressure to the row unit 10.

The row unit 10 includes a frame 14 which supports an opening disc assembly 60, a gauge wheel assembly 50 and a closing assembly 40. The opening disc assembly 60 includes two angled opening discs 62 rollingly mounted to a downwardly extending shank 15 of the frame 14. The opening discs 62 are disposed to open a v-shaped seed trench 3 in the soil surface 7 as the row unit advances forwardly through the field. The gauge wheel assembly 50 includes two gauge wheels 52 pivotally mounted to either side of the frame 14 by two gauge wheel arms 54 with the gauge wheels 52 disposed to roll along the soil surface 7. A depth adjustment assembly 90 is pivotally mounted to the frame 14 at a pivot 92. The depth adjustment assembly 90 engages with the gauge wheel arms 54 to limit the upward travel of the gauge wheel arms 54, thus limiting the depth of the trench opened by the opening disc assembly 60. The closing assembly 40 is pivotally coupled to the frame 14 and is configured to move soil back into the seed trench 3.

Continuing to refer to FIG. 1, seeds 5 are communicated from a hopper 12 to a seed meter 30 configured to singulate the supplied seeds. The seed meter 30 may be a vacuum-type meter such as that disclosed in International Publication No. WO2012/129442 or any other seed meter known in the art. In operation, the seed meter 30 dispenses singulated seeds into the seed tube 32 which communicates the singulated seeds downwardly and rearwardly before depositing the seeds into the seed trench 3.

Turning to FIGS. 2-6, the depth adjustment assembly 90 is illustrated in more detail. The depth adjustment assembly 90 includes a rocker 95 (FIGS. 4-5) pivotally mounted to a depth adjustment body 94. The depth adjustment body 94 is pivotally mounted to the row unit frame 14 about the pivot 92. A handle 98 is preferably slidably received within the depth adjustment body 94 such that the user can selectively engage and disengage the handle with one of a plurality of depth adjustment slots 97 (FIG. 6) formed within the row unit frame 14. In operation, the upward travel of the gauge wheels 52 is limited by contact of the gauge wheel arms 54 with the rocker 95. When one of the gauge wheels, e.g., left gauge wheel 52-1, encounters an obstruction, the rocker 95 allows the left gauge wheel arm 54-1 to travel upward while lowering the right gauge wheel 52-2 by the same absolute displacement such that the row unit 10 rises by half the height of the obstruction.

Depth Sensing Implements

The various agricultural trench depth sensing implements 100 described below and illustrated herein utilize a seed firmer for simplicity of the description and because the seed firmer is already an existing implement that is placed in a seed trench. However, the agricultural trench depth sensing implement 100, may utilize any tool or structure that is capable of being disposed in a soil trench opened in a soil surface for measuring depth of the soil trench. Additionally, although the agricultural trench depth sensing implements 100 are illustrated and described in connection with a seed trench formed by a planter row unit, the depth sensing implement 100 may be disposed in any trench opened in a soil surface by any implement, assembly or tool. Accordingly, the trench in which the depth sensing implement 100 is disposed may be referred to interchangeably as a soil trench or seed trench.

Ultrasonic Sensor Embodiments

Figure 7A:
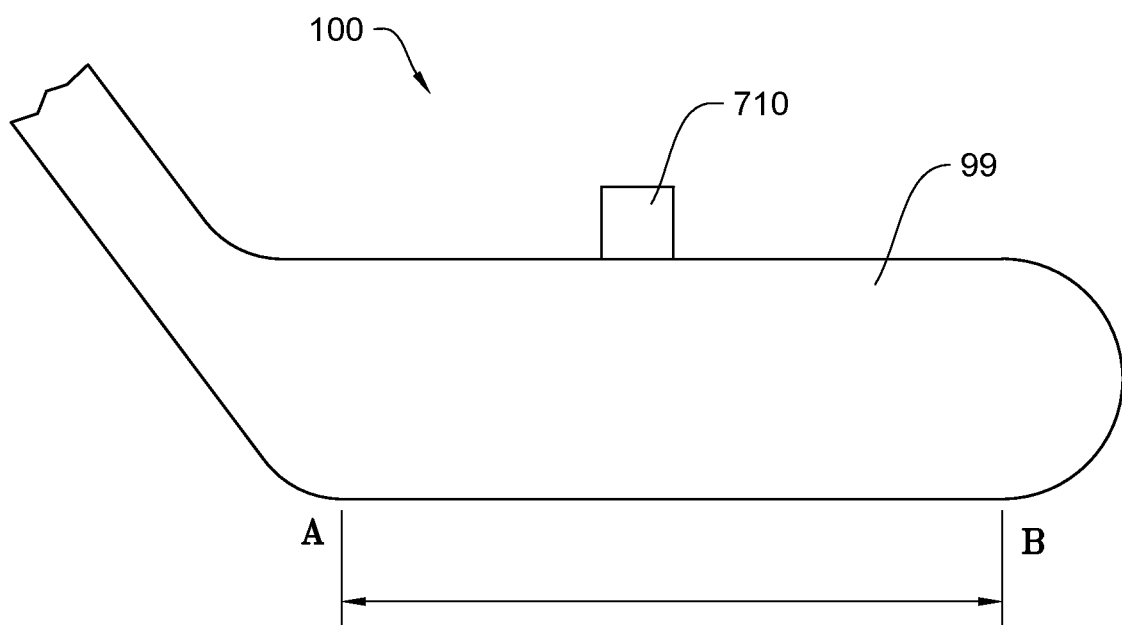
FIG. 7A is an elevation view of an embodiment of a seed firmer having an ultrasonic target.

In one embodiment of the agricultural trench depth sensing implement 100 shown in FIG. 7A, a seed firmer 99, similar to the seed firmer embodiments disclosed in U.S. Pat. No. 5,425,318, is provided with an ultrasonic target 710 disposed on the top side of a rigid portion of the seed firmer 99. The rigid portion of the seed firmer is anyplace in which a point on top of the seed firmer remains relative to a point at the rearward or trailing end of the seed firmer. In FIG. 7, for the seed firmer shown, the rigid portion is anywhere between A and B on seed firmer 99. Seed firmer 99 may be mounted to row unit 10 as recognized by those of skill in the art.

Figure 7B:
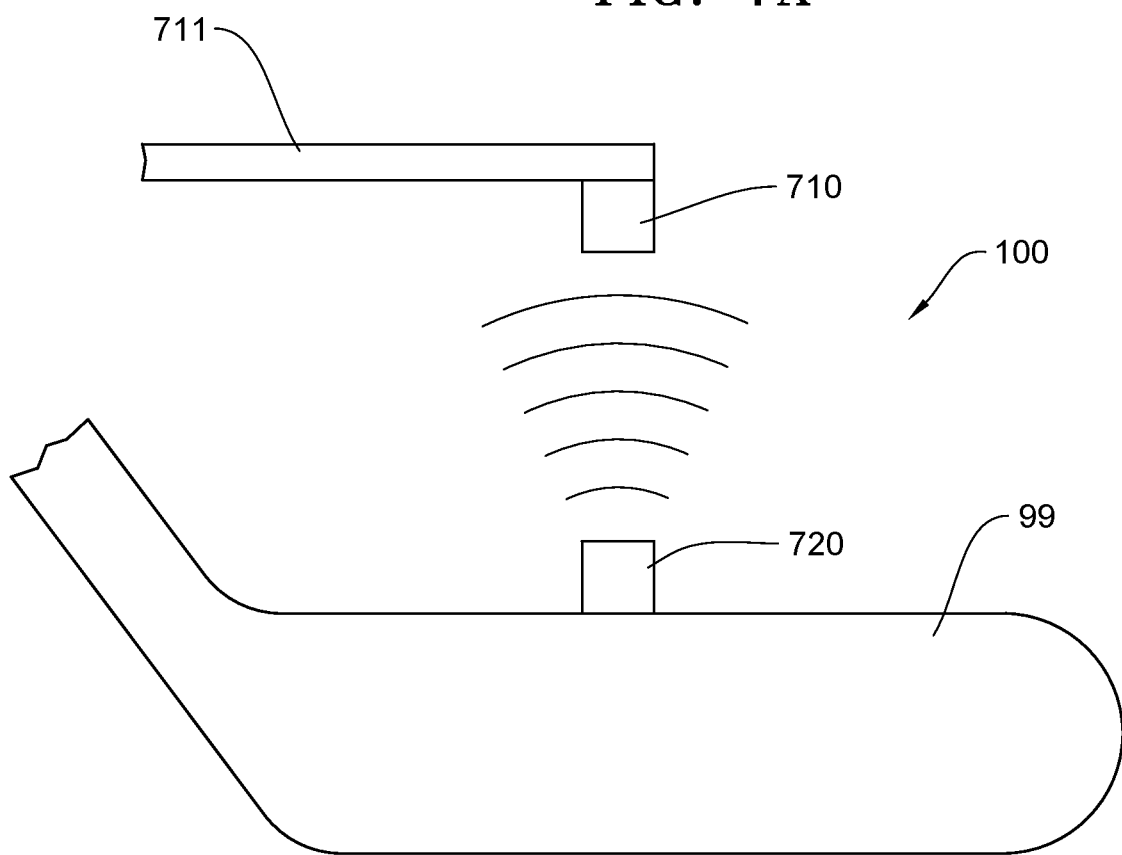
FIG. 7B is an elevation view of an embodiment of a seed firmer having an ultrasonic transmitter aimed at a target mounted to a row unit.

In another embodiment of the depth sensing implement 100 shown in FIG. 7B, seed firmer 99 is provided with an ultrasonic transmitter 720 mounted on the top side of a rigid portion of the seed firmer 99. An ultrasonic target 710 may be mounted (such as by an arm 711) to the row unit 10 and aimed at seed firmer 99 to receive an ultrasonic signal from the ultrasonic transmitter 720. The purpose of providing an ultrasonic target 710 is for returning an ultrasonic signal to an ultrasonic transmitter or for receiving an ultrasonic signal.

The ultrasonic transmitter and the ultrasonic receiver may be combined as a transceiver. At least one ultrasonic sensor may be used in conjunction with seed firmer 99.

Figure 8:
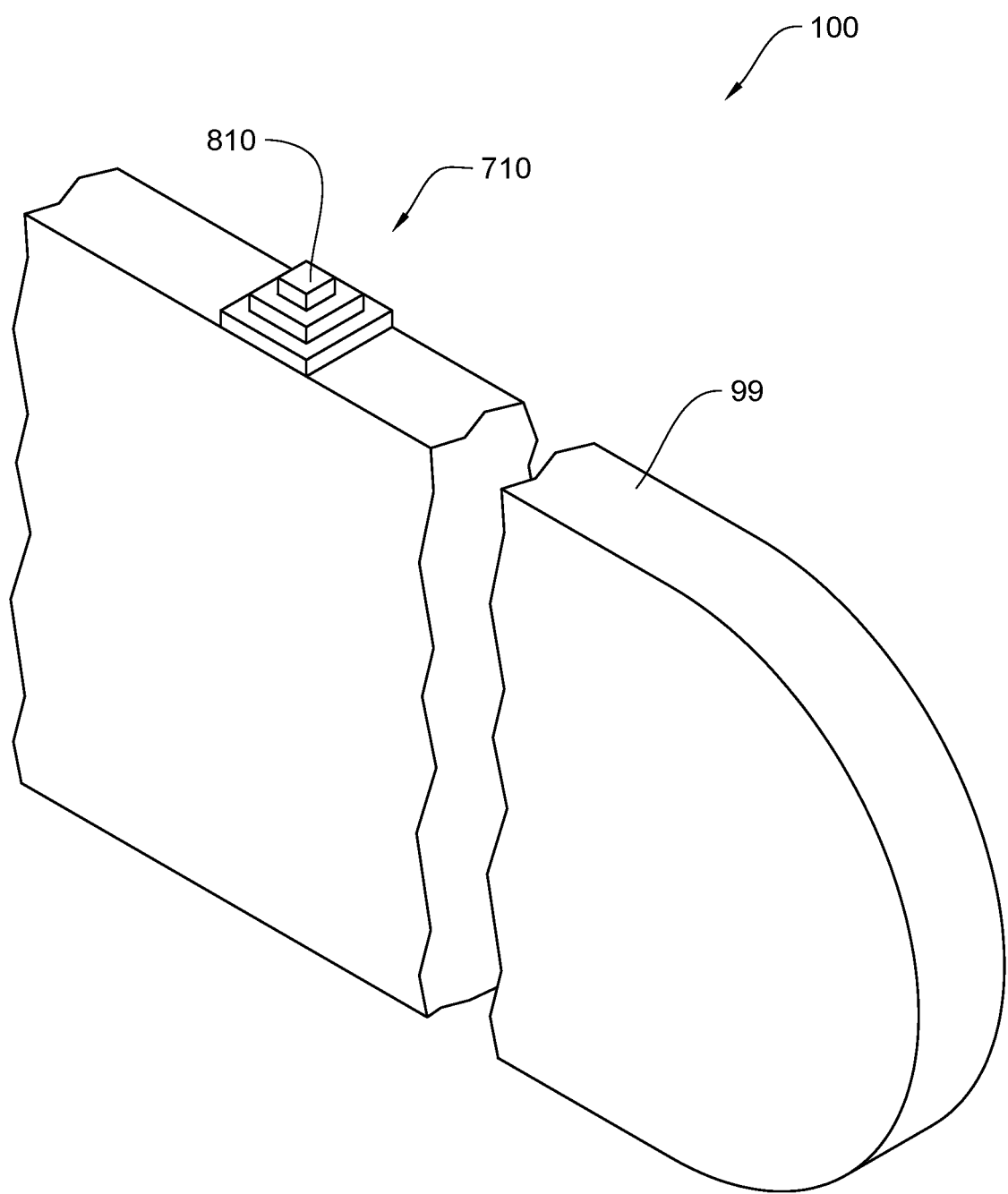
FIG. 8 is a partial perspective view of an embodiment of a seed firmer having an ultrasonic target disposed on a top surface of the seed firmer.
Figure 9:
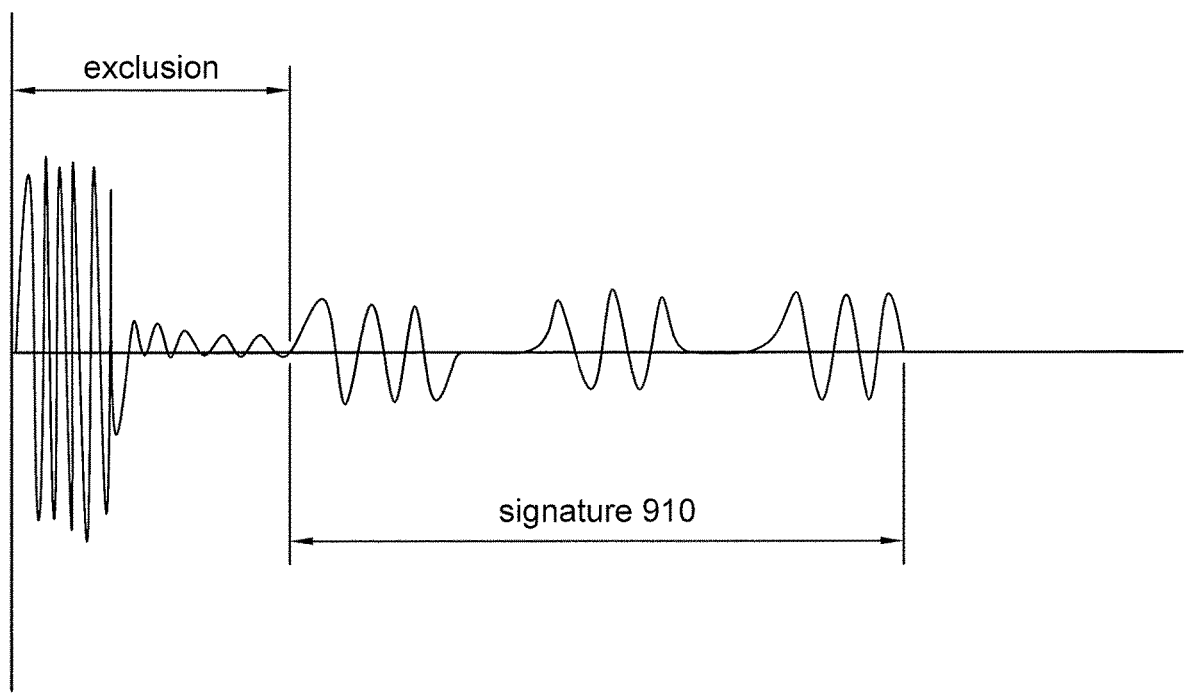
FIG. 9 is a representative illustration of signals generated by an ultrasonic sensor.

The ultrasonic target 710 may have a unique shape to return a unique signal back to the ultrasonic sensor. Referring to FIG. 8, one embodiment providing a unique shape is a stepped block 810 having three different step heights. With the ultrasonic target 710 comprising a stepped block 810 the signal generated and returned will initially be an area of high amplitude as the signal is first generated, then there will be a period of low amplitude before three areas of amplitude will be observed corresponding to each height on the step block 810 with a spacing between each block's return signal. The step block 810 provides a signature signal 910 that can be used for measuring depth. FIG. 9 is a representative illustration of the signature 910 of a return signal for ultrasonic sensor 710 having three different levels.

Figure 7C:
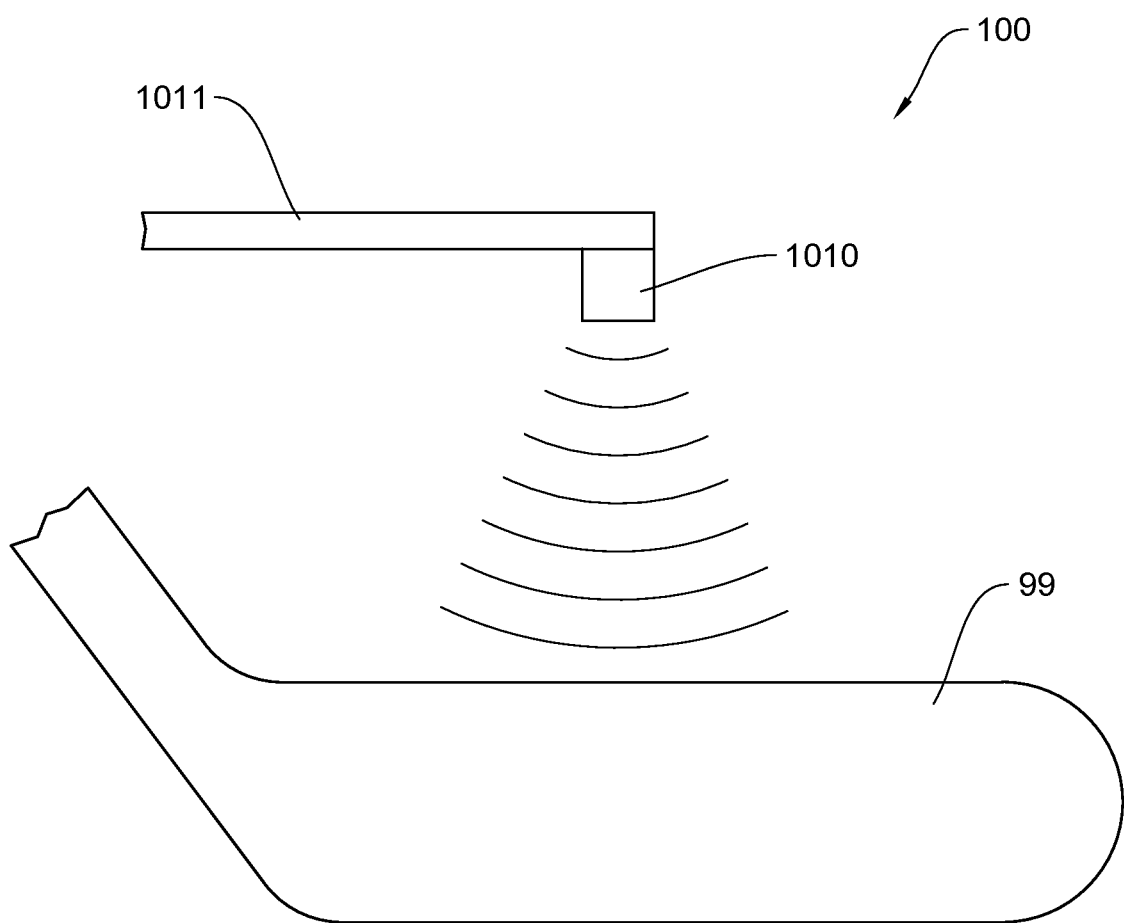
FIG. 7C is an elevation view of an embodiment of a seed firmer without an ultrasonic target in use with an ultrasonic transmitter mounted to a row unit.

In another embodiment of the depth sensing implement 100 shown in FIG. 7C, a depth sensing system is provided with a seed firmer 99 without an ultrasonic target 710. In this embodiment, ultrasonic sensor 1010 measures the distance to the top of seed firmer 99 directly with the ultrasonic sensor 1010 mounted to row unit 10 (such as by an arm 1011) and aimed at seed firmer 99.

Referring to FIGS. 10A-10C, which are top plan views of the embodiments of FIGS. 7A-7C, respectively, there can additionally be a pair of ultrasonic sensors (1020-1, 1020-2) disposed on the row unit 10 with one aimed at soil surface 7-1 adjacent to one side of the soil trench 3 and the other aimed at soil surface 7-2 adjacent to the other side of the soil trench 3. In FIG. 10A, the ultrasonic target 710 is disposed on the top side of the seed firmer 99 and the transmitter/transceiver 720 disposed on the row unit 10 supported therefrom by arm 711. In FIG. 10B, the transmitter/transceiver 720 is disposed on the top side of the seed firmer 99 and the ultrasonic target 710 is disposed on the row unit 10 supported therefrom by arm 711. In FIG. 10C, the transceiver 1010 is disposed on the row unit 10 supported therefrom by arm 1011 without a target on the seed firmer 99. By providing the pair of ultrasonic sensors 1020-1, 1020-2 on each side of the soil trench 3 in conjunction with the ultrasonic sensor disposed on or over the seed firmer, three measurements are provided which may be used to determine depth of the soil trench 3. The measurements from each side can be averaged or weighted to provide a single measurement for reference for the soil surface. This can be useful when there is debris as described below. The difference between the measurement for soil surfaces 7-1 and/or 7-2 to seed firmer 99 can be used to determine the depth of the soil trench 3.

In any of the above embodiments of the depth sensing implement 100, there is an expected range of distance between a transmitted ultrasonic signal and the object that is being targeted. There may debris, such as a rock, a clump of dirt, or a plant stalk, next to the soil trench 3 which will shorten the measured distance. In the case of a plant stalk, the plant stalk may lean over the soil trench 3 and come between the ultrasonic signal to or from seed firmer 99. When a signal is received that translates to a distance outside of an expected range, the data for this measurement may be discarded to prevent an unrealistic measurement from being used.

It should be appreciated that gauge wheels 52 or wheels on closing assembly 40 may cause a divit near the sides of the soil trench 3. When measuring the distance to the ground, this divit distance may be accounted for when mounting the sensors 1020-1, 1020-2 on the row unit 10.

In any of the embodiments above, a plurality of measurements for a given location may be taken and averaged. For example, three measurements for a given location may be taken and averaged.

Figure 11B:
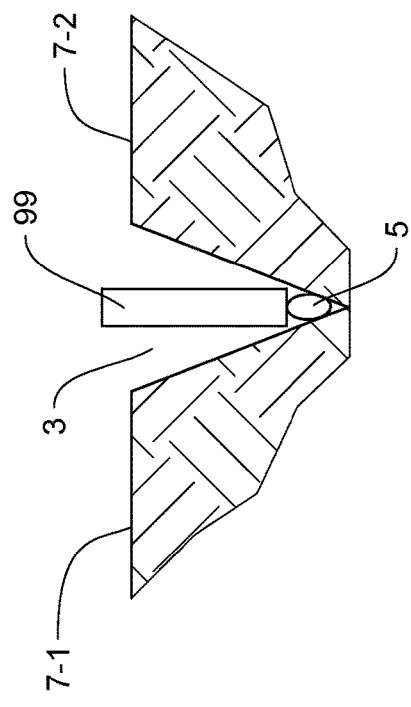
FIG. 11B is an elevation view of the seed firmer of FIG. 11A shown in a seed trench with the finger sensors disposed on each side of the seed trench.
Figure 11A:
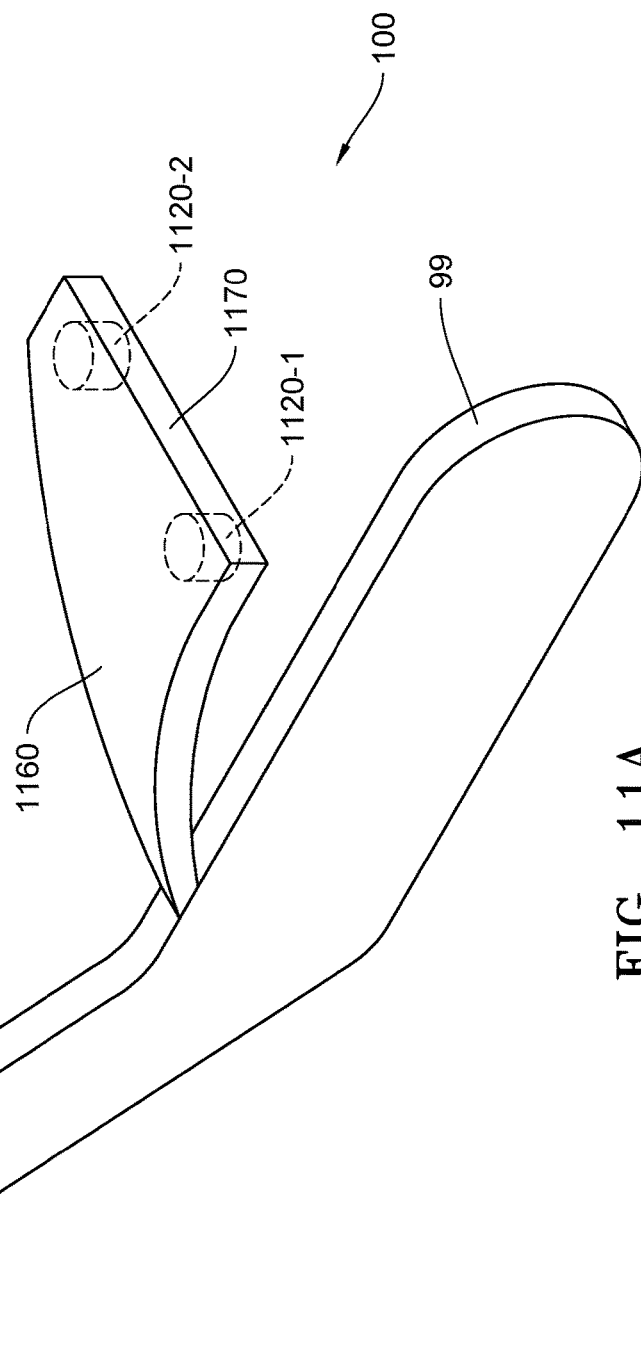
FIG. 11A is a perspective view of an embodiment of a seed firmer with ultrasonic transceivers supported on a transverse arm above the seed firmer.

FIG. 11A shows another embodiment of depth sensing implement 100 comprising a seed firmer 99 with a mounting arm 1160 mounted to the rigid portion of seed firmer 99 and capable of rising above the seed firmer 99. The mounting arm 1160 supports a transverse portion 1170 perpendicular to seed firmer 99 and sized so that the outer ends of the transverse portion 1170 extend over adjacent sides of trench 7-1 and 7-2. Ultrasonic transceivers 1120-1 and 1120-1 are disposed near the outer ends of the transverse portion 1170 and are aimed down to adjacent sides 7-1 and 7-2 of the soil trench 3. Knowing the placement of seed firmer 99, ultrasonic transceivers 1120-1 and 1120-2 measure the distance to the adjacent sides of trench 7-1 and 7-2 so that the seed depth in seed trench 3 may be calculated. Alternatively, only one transceiver 1120-1 or 1120-2 may need to be used, but having both allows for better measurement and accounting for debris. This embodiment simplifies over the embodiments described below in connection with FIGS. 12A to 12C by eliminating one measurement.

Figure 11C:
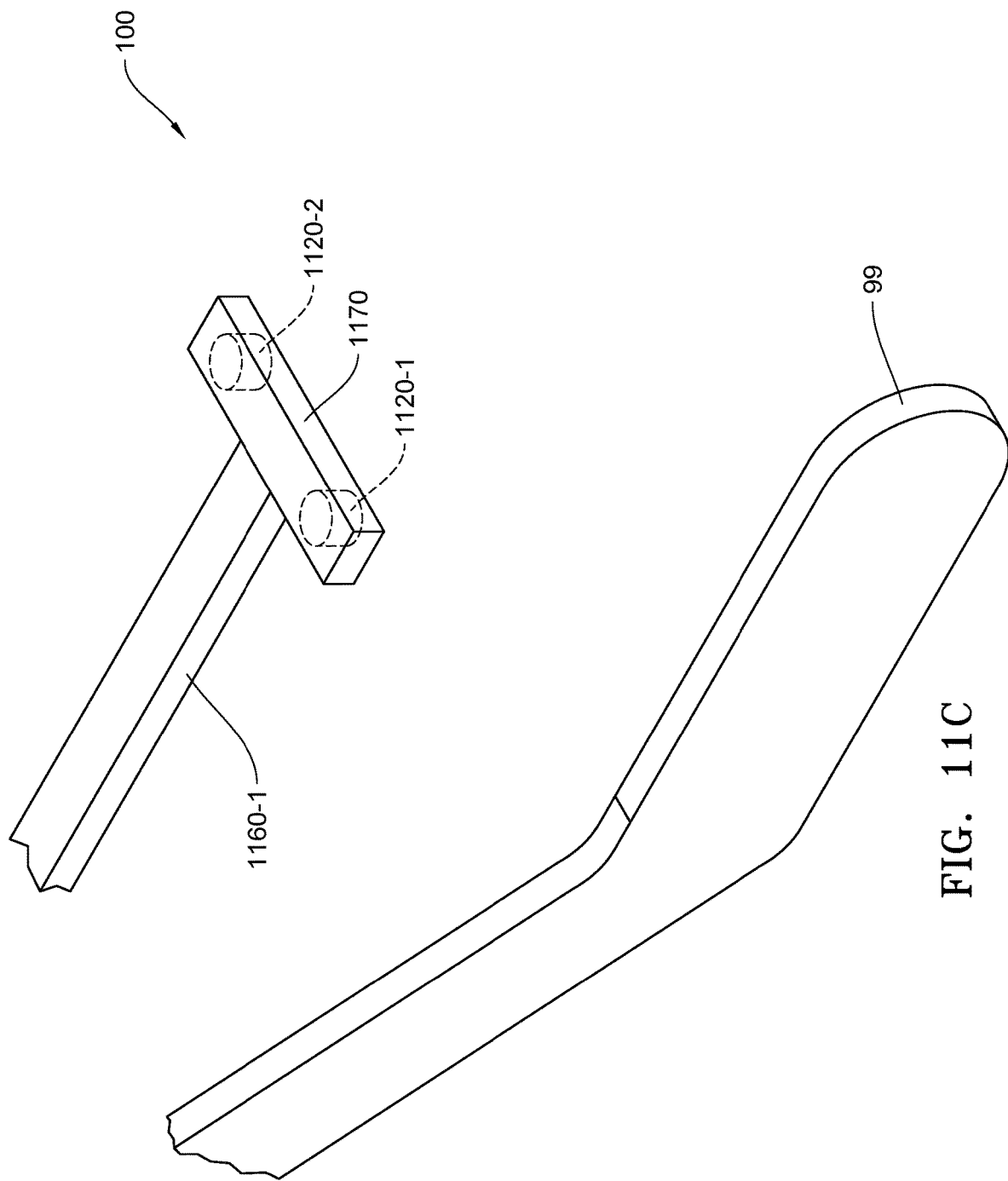
FIG. 11C is a perspective view of an embodiment of a seed firmer with ultrasonic transceivers supported on a transverse arm above the seed firmer and mounted to the row unit.

FIG. 11C shows another embodiment of a depth sensing implement 100 similar to the embodiment shown in FIG. 11A, except that mounting arm 1160-1 is disposed on row unit 10. Knowing the placement of seed firmer 99, ultrasonic transceivers 1120-1 and 1120-2 measure the distance to the adjacent sides of trench 7-1 and 7-2 so that the seed depth in trench 3 can be calculated. Also, only one ultrasonic transceiver 1120-1 or 1120-2 may need to be used, but having both allows for better measurement and accounting for debris.

Finger Sensor Embodiments

FIGS. 12A-12F illustrate various embodiments a depth sensing implement 100 comprising a seed firmer 99 to which is coupled a first ground engaging finger 1210 and a second ground engaging finger 1220 wherein the first ground engaging finger 1210 contacts soil surface 7-1 adjacent soil trench 3, and the second ground engaging finger 1220 contacts soil surface 7-2 adjacent soil trench 3.

In a first embodiment shown in FIG. 12A-1, each ground engaging finger 1210 and 1220 is disposed on seed firmer 99 independent from the other ground engaging finger. Each ground engaging finger 1210, 1220 is pivotally mounted to brackets 1230-1 and 1230-2 that are disposed on the rigid portion of seed firmer 99 that allows for rotation of the ground engaging finger 1210 and 1220 in a vertical direction. To measure the distance that each ground engaging finger 1210 and 1220 travels relative to seed firmer 99, bracket 1230-1 and 1230-2 each have a rotary encoder 1240-1 and 1240-2 (such as angular displacement sensor no. 55250 available from Hamlin Incorporated, Lake Mills, WI.). In operation, the ground engaging fingers 1210 and 1220 ride along the soil surface 7-1, 7-2 (see FIG. 12A-2) such that the angular position of the ground engaging finger 1210 and 1220 is constrained relative to the soil surface. A signal generated by the encoders 1240-1 and 1240-2 is thus related to the vertical height of the row unit 10 with respect to the soil, and thus to the depth of the soil trench 3.

Figure 12B:
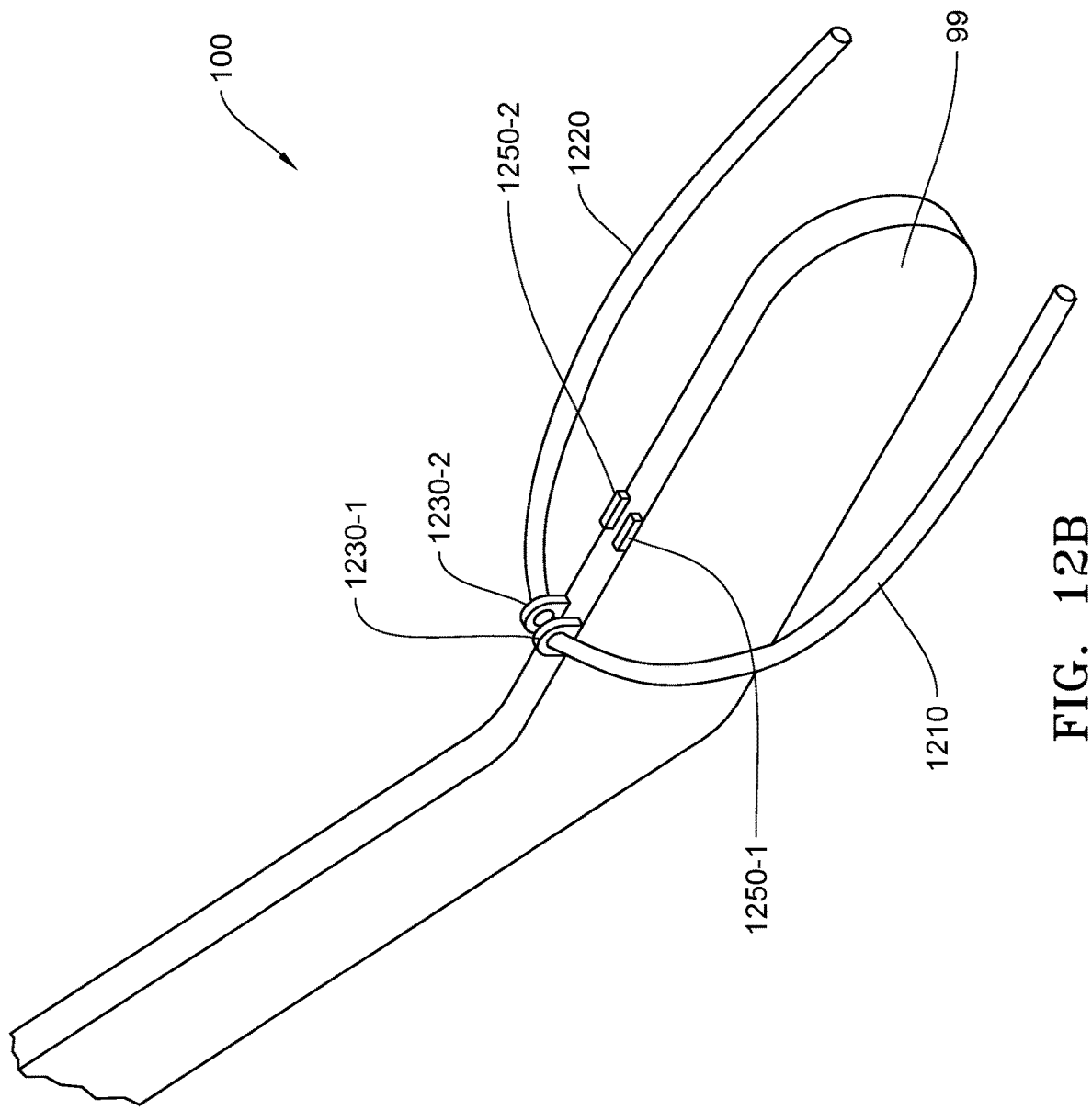
FIG. 12B-12F are perspective views of a seed firmer with alternative embodiments of finger sensors.
Figure 12C:
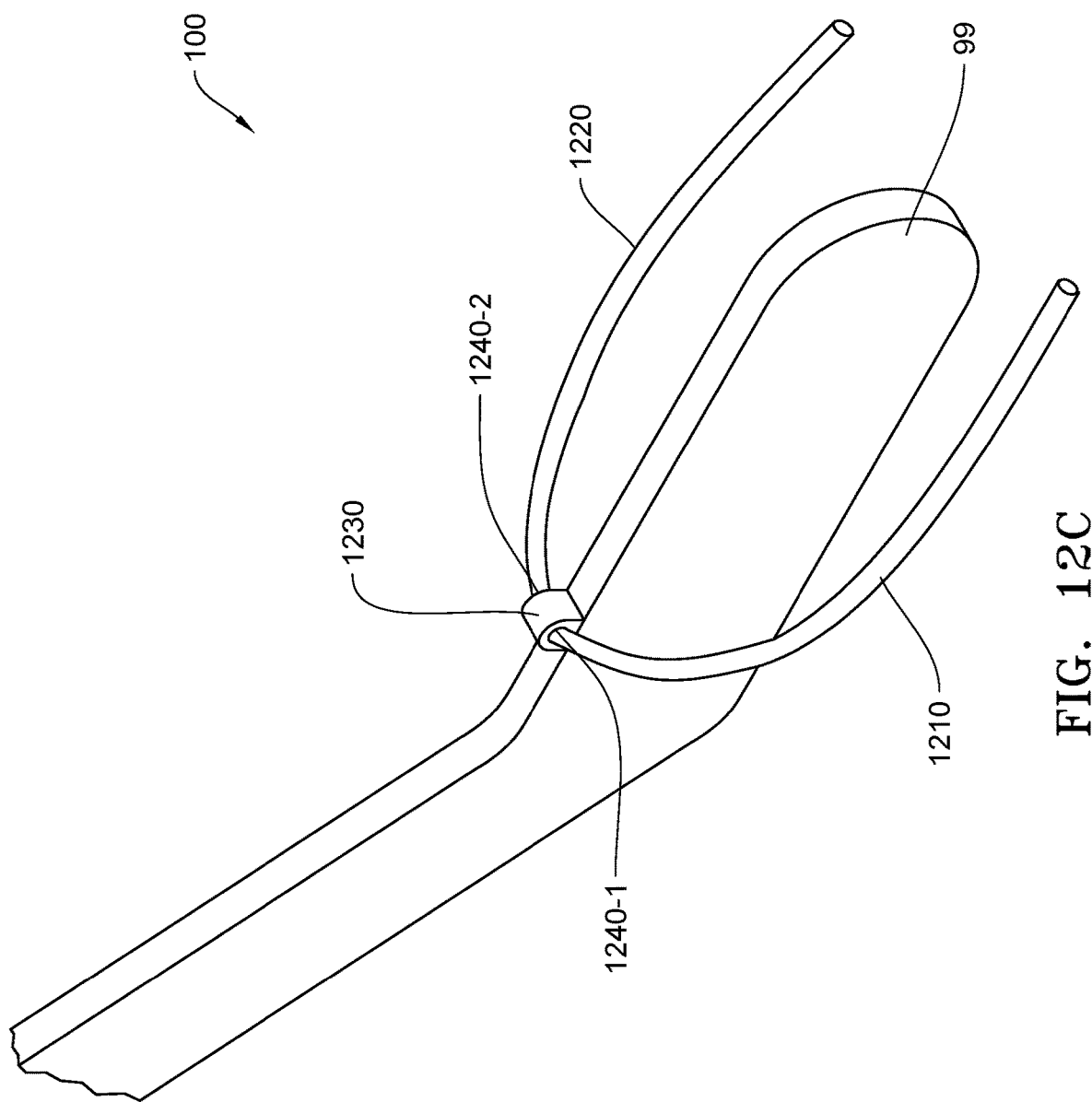

In an alternative embodiment shown in FIG. 12B, the ground engaging fingers 1210 and 1220 are pivotally mounted to brackets 1230-1 and 1230-2, but instead of the rotary encoder 1240-1 and 1240-2 (as in FIG. 12A), in the embodiment of FIG. 12B, Hall effect sensors 1250-1 and 1250-2 are disposed on or in seed firmer 99 for detecting a position of the ground engaging fingers 1210 and 1220. In either of the embodiments shown in FIG. 12A or 12B, rather than two brackets 1230-1, 1230-2, there may be a single bracket 1230, such as shown in FIG. 12C.

Figure 12D:
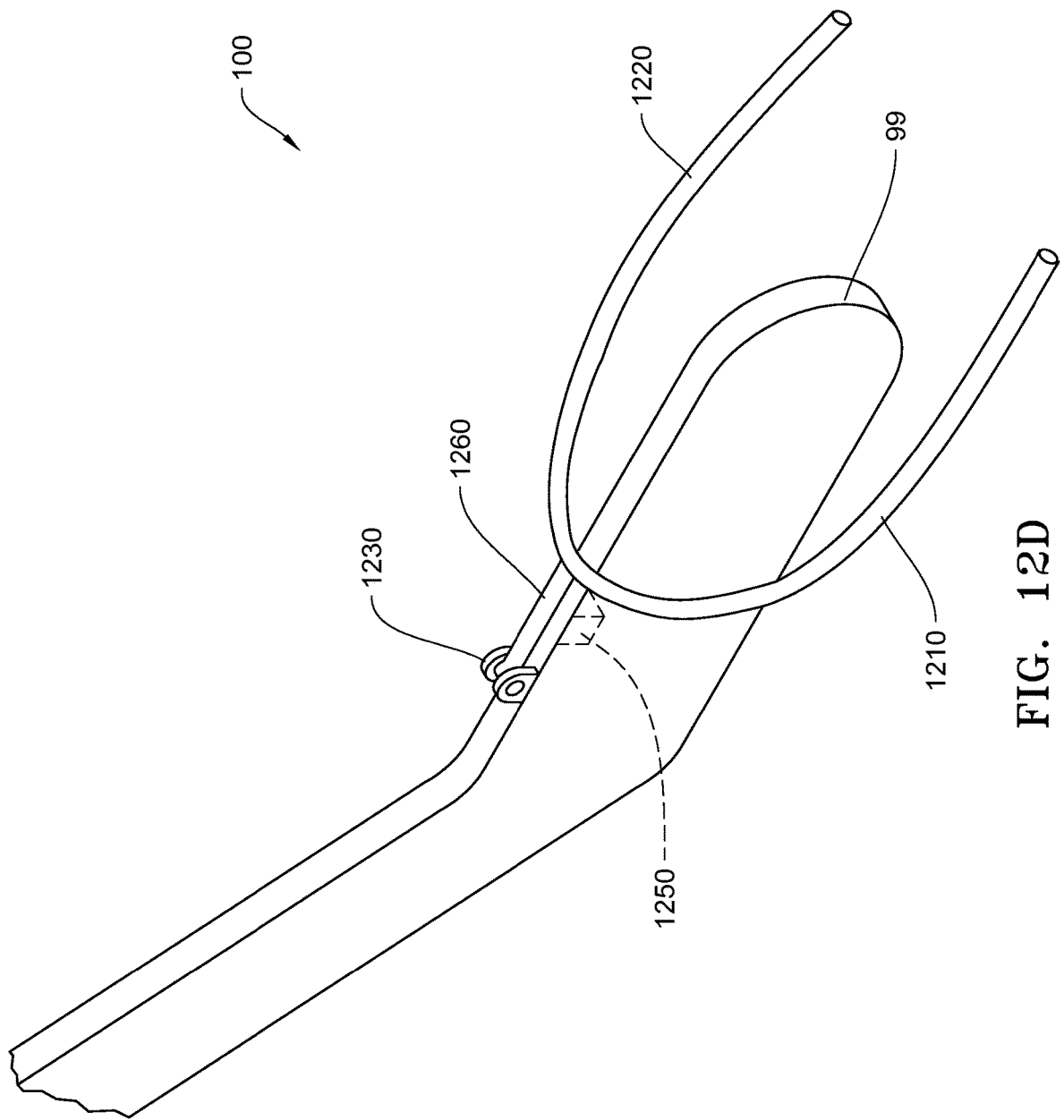

FIG. 12D illustrates yet another alternative embodiment of a depth sensing implement 100 apparatus utilizing finger sensors. In this embodiment, ground engaging fingers 1210 and 1220 are connected together through an arm 1260 pivotally connected at its distal end to a bracket 1230. The arm 1260 pivots or rotates about a pivot axis of the bracket 1230 in a vertical direction above seed firmer 99 to allow ground engaging fingers 1210 and 1220 to raise and lower to engage soil surface 7-1 and 7-2, respectively. A Hall effect sensor 1250 is disposed on or in seed firmer 99 or on or in the arm 1260 for detecting the position of the arm 1260 relative.

Figure 12E:
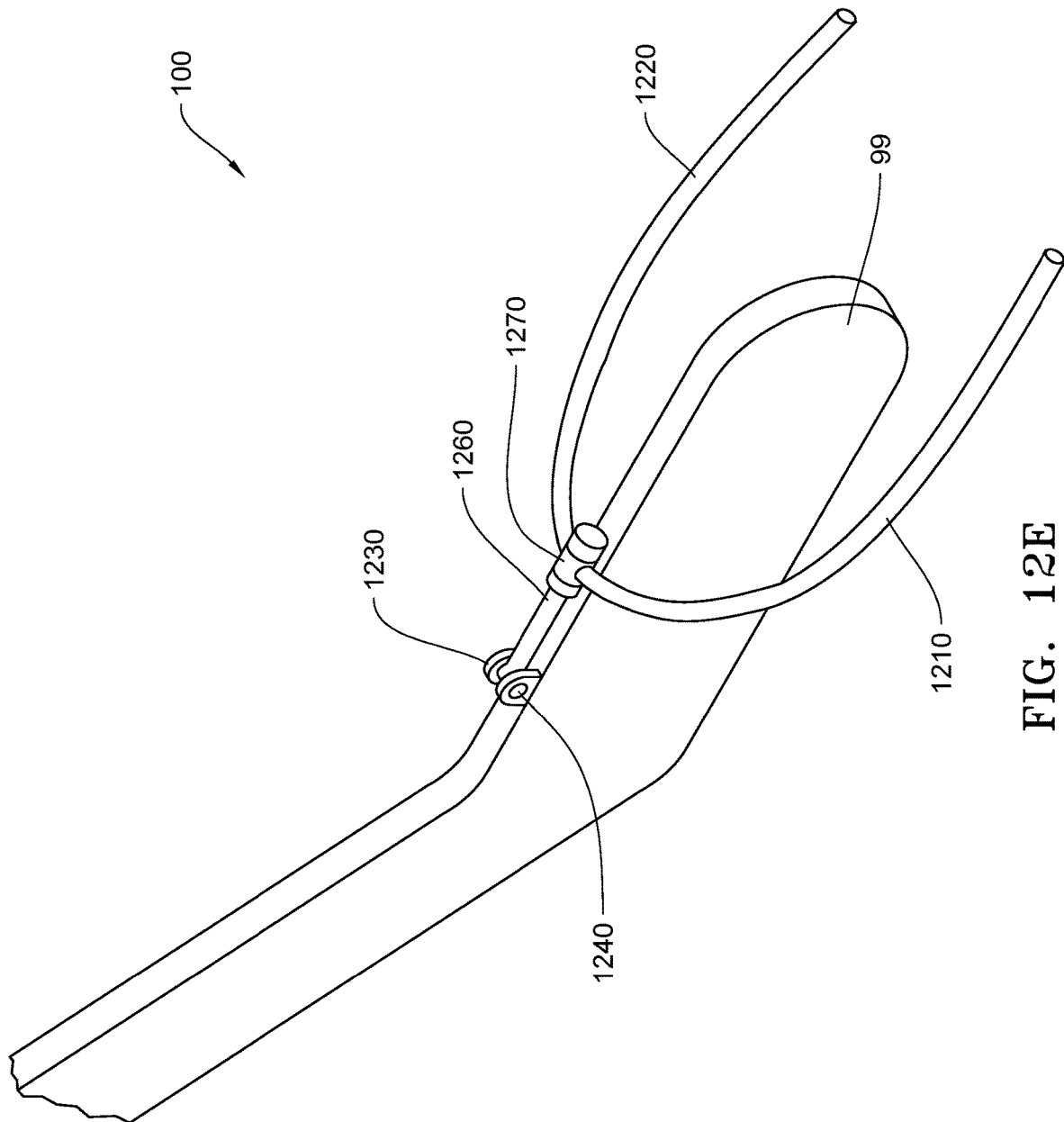

In another embodiment shown in FIG. 12E, ground engaging fingers 1210 and 1220 are connected through an angular displacement sensor 1270 allowing for rotation around seed firmer 99. The angular displacement sensor 1270 is connected through an arm 1260 that is pivotally mounted to a bracket 1230 disposed on the rigid portion of seed firmer 99 such that the arm 1260 is able to pivot or rotate about a pivot axis through the bracket 1230 in a vertical direction. This configuration allows for one or both ground engaging fingers 1210 and 1220 to engage soil surface 7-1 and 7-2, respectively. Arm 1260 will pivot in a vertical direction above seed firmer 99, and ground engaging fingers 1210 and 1220 will be able to rotate around seed firmer 99 to the lowest point. In the event that one ground engaging finger 1210 or 1220 encounters debris, such as a rock, a clump of dirt, or a stalk, the other ground engaging finger will still be able to rotate towards the soil surface 7. This allows for better exclusion of data samples that are out of the expected range. Thus, it should be appreciated that if the ground engaging fingers 1210 and 1220 are in fixed relationship to each other, any debris will cause both ground engaging fingers 1210 and 1220 to be at the same vertical height over seed firmer 99. However, with angular displacement sensor 1240 as shown in FIG. 12E, when measuring the height displacement of arm 1260, angular displacement sensor 1270 can allow for detection of debris and correction of the height based on the rotation of angular displacement sensor 1270.

Figure 12F:
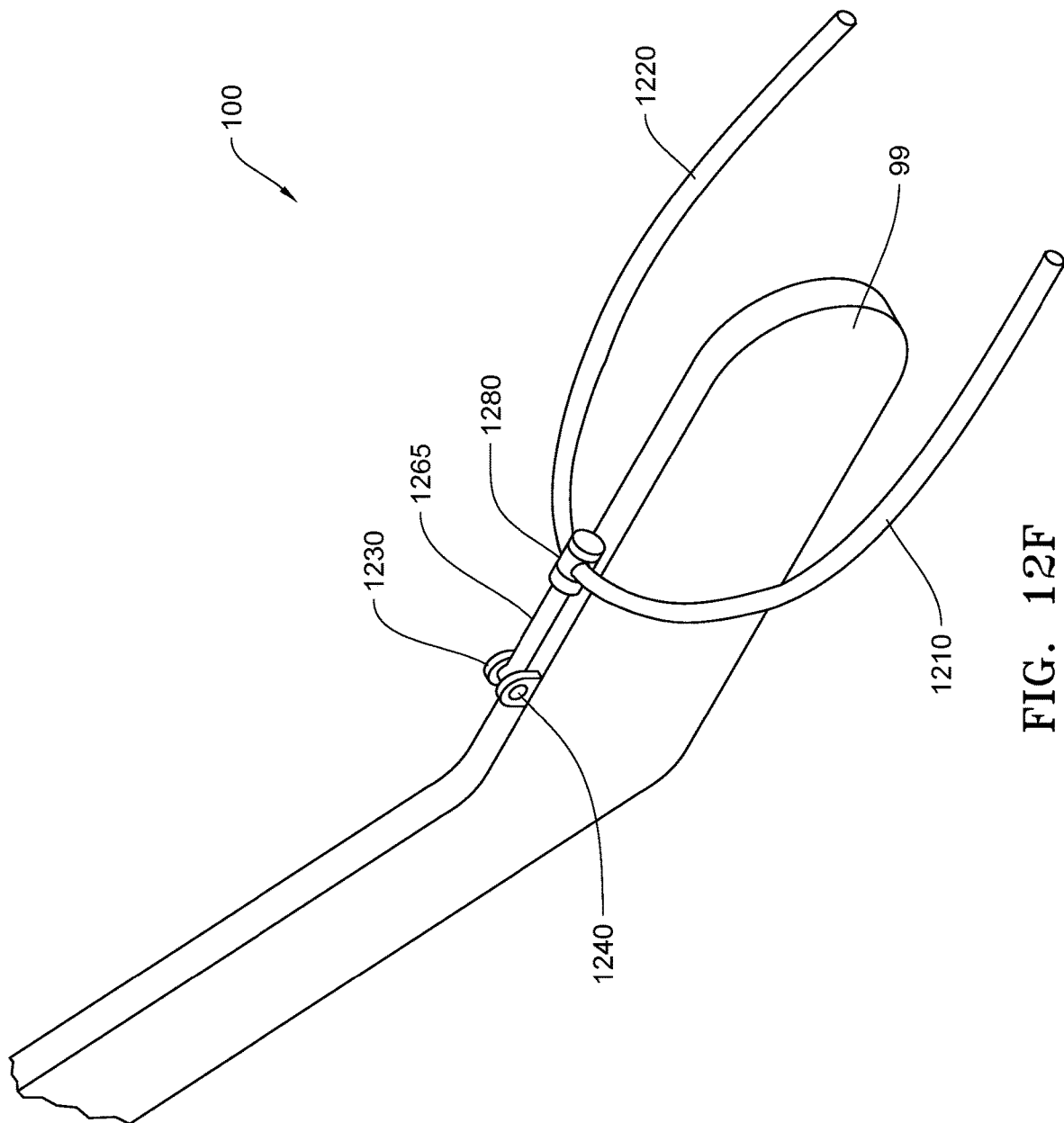

In another embodiment shown in FIG. 12F, which is similar to the previous embodiment shown in FIG. 12E, ground engaging fingers 1210 and 1220 are connected through a pivot 1280 allowing for rotation around seed firmer 99. The arm 1265 supports the pivot 1280 at its rearward end and the forward end of the arm 1265 is pivotable about pin 1240 within the bracket 1230 disposed on the rigid portion of seed firmer 99 thus allowing for the rotation of arm 1265 in a vertical direction. This configuration allows for one or both ground engaging fingers 1210 and 1220 to engage soil surface 7-1 and 7-2, respectively. Arm 1265 will pivot in a vertical direction above seed firmer 99, and ground engaging fingers 1210 and 1220 will be able to rotate around seed firmer 99 to the lowest point. In the event that one ground engaging finger 1210 or 1220 encounters debris, such as a rock, a clump of dirt, or a stalk, the other ground engaging finger will still be able to rotate towards the soil surface 7 and thus have angular displacement sensor travel about half of the distance if the pivot 1280 were not present. This allows for better exclusion of data samples that are out of the expected range. When both ground engaging fingers 1210 and 1220 are in fixed relationship to each other, any debris causes both ground engaging fingers 1210 and 1220 to be at the same vertical height over seed firmer 99.

Side Sensor Embodiments

FIGS. 13A-13F illustrate various alternative embodiments of a trench depth sensing implement 100 which utilize a seed firmer 99 with side sensors 1310. Each of the side sensors are in electrical communication with a processor 120 (discussed below). In the embodiment illustrated in FIG. 13A, seed firmer 99 has a plurality of sensors 1310 disposed in vertical alignment on the side of seed firmer 99 at a rigid portion for sensing the presence of soil in the soil trench 3. The rigid portion of the seed firmer 99 on which the sensors 1310 are disposed may have a height greater than the depth of the soil trench 3 such that least one of the sensors 1310 is above the soil surface 7 in order to detect the top of the soil trench 3. It should be appreciated that if seed firmer 99 does not have a sufficient height, then all sensors 1310 would be in the trench 3 and the top of the trench 3 could not be determined. Alternatively, rather than rigid portion of the seed firmer having a height greater than the depth of the soil trench, the sensors 1310 may be disposed in the rigid portion section of the seed firmer 99 toward the forward end (i.e., opposite the rearward or trailing end 98 of the seed firmer 99) where the seed firmer curves upward towards the attachment end 97 above the soil trench 3 such that at least one of the sensors 1310 is above the top of soil trench 3.

FIG. 13C illustrates another embodiment of a trench depth sensing implement 100 in which side sensors 1310 are disposed on a wall 1320 that diverges outwardly from the body of the seed firmer 99 and rearwardly away from the forward resilient portion 1340 of the seed firmer 99 such that at least some of the side sensors 1310 are in contact with the sidewall of the soil trench 3. As illustrated in FIG. 13D, a biasing element 1350, such as a spring, may be disposed between seed firmer 99 and wall 1320 to bias the wall 1320 outwardly toward the sidewall of the soil trench 3. Illustrated in FIG. 13E is another embodiment in which the bottom 1321 of wall 1320 is connected at the bottom 1322 of seed firmer 99 such that the wall 1320 diverges outwardly upwardly from the bottom 1322 of the seed firmer 99.

In another embodiment illustrated in FIG. 13F, the sensors 1310 are disposed on an arcuate wall 1330 which diverges outwardly from the body of the seed firmer 99 and rearwardly away from the forward resilient portion 1340 of the seed firmer 99 before curving back toward the seed firmer body. In this embodiment, the forward end, the rearward end as well as the upper end and bottom end of the arcuate wall 1330 are connected to the body of the seed firmer 99. The arcuate wall 1330 may be biased away from the body of the seed firmer 99 towards a sidewall of the trench, such as by a spring 1350 disposed between the body of the seed firmer 99 and the arcuate wall 1330.

It should be appreciated that the more sensors 1310 disposed on the seed firmer 99 or on the walls 1320, 1330 will allow for an increased fineness of measurement of the depth of the soil trench 3. In the various embodiments, there may be at least three sensors 1310 or at least four, at least five, at least six, at least seven, at least eight, at least nine, or at least ten sensors 1310.

The sensors 1310 may be any sensor that can sense soil in the side of the soil trench 3. These can include, but are not limited to, optical, capacitance, inductive, radar, or ultrasonic. The depth of the soil trench 3 may be determined by knowing the relative position of the seed firmer 99 on row unit 10 in relation to the bottom of seed firmer 99 such that the change between sensors indicating a difference between soil and above the trench. The location of these sensors is then used for determining depth. It should be appreciated that soil trenches are typically V-shaped. Thus, depending on the embodiment, sensors 1310 at the bottom of seed firmer 99 may be closer to the soil defining the sidewalls of the soil trench than the sensors 1310 at the top of seed firmer 99. The difference in signal may be taken into consideration for determining the top of trench 3.

As stated previously, although the embodiments above are described and illustrated with a seed firmer 99 that is typically used when planting and which is disposed in the seed trench 3, it will be appreciated that seed firmer 99 may be replaced with any other implement that can be attached to a planter row unit 10 or other agricultural implement. With respect to planter row units, the depth being measured is the depth where seed 5 is in the seed trench 3. Seed trenches are typically formed as a V-shape by opening discs 62, and because of the size and/or shape of seed 5, the seed 5 may not be fully at the bottom of trench 3. Thus for planter applications, it may be more important to determine the actual depth of seed 5 and not the total depth of the seed trench 3. In such applications, because the bottom of seed firmer 99 contacts the top of seed 5, knowing the location of seed firmer 99 allows for knowing the depth of the seed 5.

Accelerometer

Figure 15:
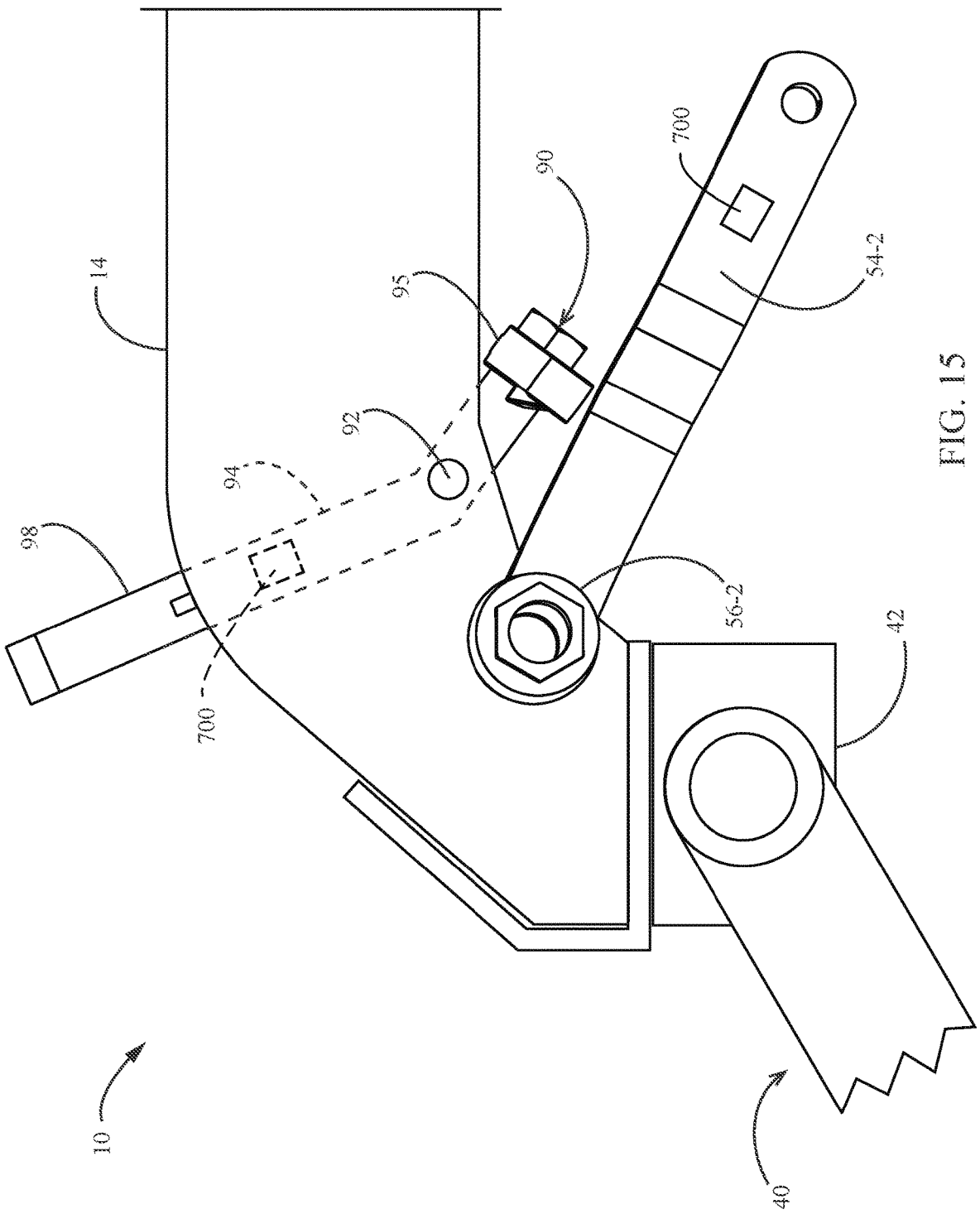
FIG. 15 is an embodiment of an accelerometer disposed on a depth adjustment body or gauge wheel arm.
Figure 16:
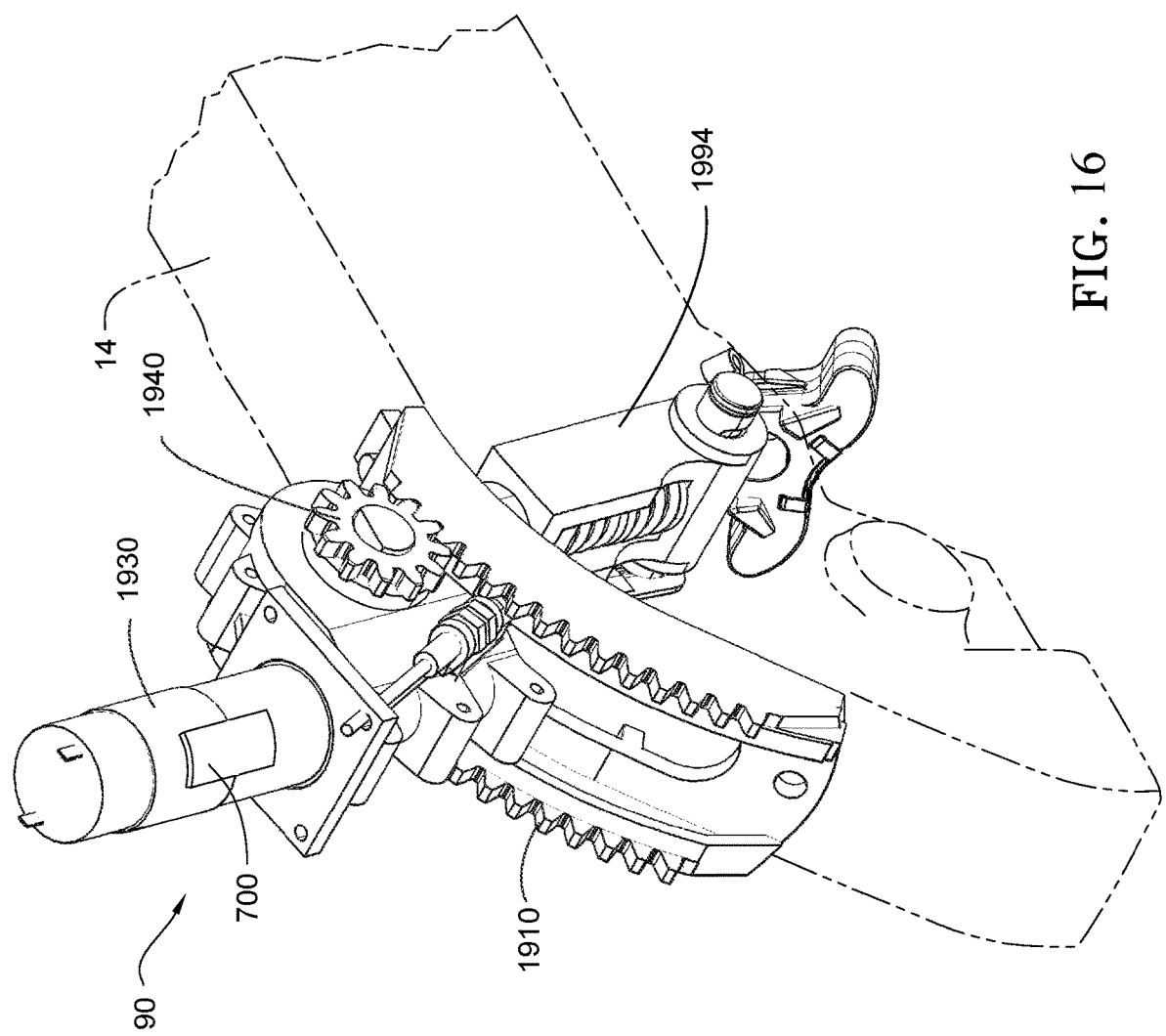
FIG. 16 is embodiment of an accelerometer disposed on a depth adjustment assembly.

In another embodiment, an accelerometer 700 may be disposed on any part that adjusts when depth is adjusted. Parts that adjust when depth is adjusted include gauge wheel arm 54, depth adjustment body 94, or a depth adjustment assembly 90. Examples of depth adjustment assemblies are described in PCT Application No. PCT/US2017/018269, which is incorporated herein by reference in its entirety. Each of the parts that adjust when depth is adjusted have a range of motion that is related to a position of the gauge wheel 52, which translates to gauge wheel arm 52, depth adjustment body 94, and depth adjustment assembly 90, which thus relates to depth of the soil trench. As the position of any of these parts on which the accelerometer is disposed changes position across its range of motion, the orientation of accelerometer 700 changes. The change in orientation of accelerometer 700 relates to the position of the part, which provides the depth of the soil trench 3. In one embodiment, accelerometer 700 is positioned so that none of its x-axis, y-axis, or z-axis are perpendicular to the ground across the entire range of motion of the part. This allows all three axes to be used to determine position across the full range of motion. FIG. 15 illustrates accelerometer 700 disposed on depth adjustment body 94 or gauge wheel arm 54-2. Both placements are used for illustration purposes in a single drawing, but only one accelerometer 700 is required. FIG. 16 illustrates accelerometer 700 disposed on an embodiment of depth adjustment assembly 90 providing automatic depth control (discussed below).

Automatic Trench Depth Adjustment

A trench depth adjustment system 500 for automatically controlling the depth of the soil trench 3 is illustrated in FIG. 14. The trench depth sensor implement 100 (representing any of the above sensors) mounted to each row unit 10 is in communication (electrical or wireless) with a processor 120. The processor 120 may be disposed in the trench depth sensing implement 100, on the row unit 10, or incorporated into the monitor 540 (as shown in FIG. 14) located in the cab 80 of a tractor drawing the planter. The monitor 540 is in electrical communication with a depth adjusting assembly 90 configured to modify the depth of the trench 3. The monitor 540 may include a central processing unit, a memory, and a graphical user interface configured to display the depth measured by the trench depth sensor implement 100. The monitor 540 may include processing circuitry configured to modify a command signal to the depth control assembly 90 based on an input from the trench depth sensor implement 100. The command signal preferably corresponds to a selected depth. The monitor 540 may also be in electrical communication with a GPS receiver 550 mounted to the tractor or the planter.

A trench depth control system, such as disclosed U.S. Patent Application Publication No. 2013/0104785, incorporated herein in its entirety by reference, may be configured to automatically control the depth adjusting assembly to modify the depth of the trench 3 based on depth measured by the trench depth sensor implement 100. FIG. 16 illustrates an alternative embodiment for automatically controlling trench depth based on depth measured by the trench depth sensor implement 100. As illustrated in FIG. 16, and as disclosed in Applicant's International Patent Application No. PCT/US2017/018274, incorporated herein in its entirety by reference, a depth adjustment assembly 90 utilizes a gear rack 1910 and an electric motor 1930 configured to drive gears 1940 along the gear rack 1910. The electric motor 1930 is in electrical communication with the monitor 540, which is in communication with any of the embodiments of the trench depth sensor implements 100 disclosed herein. As discussed in more detail below, when the monitor 540 determines that the measured trench depth is not equal to or within a threshold range (e.g., 5%) of a preselected depth, the monitor 540 sends a command signal to actuate the electric motor 1930 to drive the gears 1940 to position the depth adjustment body 1994 with respect to the frame 14 and the gauge wheel arms 54 to produce the measured trench depth that approximates the selected trench depth.

The measured trench depth may be mapped by the monitor 540 recording and time-stamping the GPS position of the planter reported by the GPS receiver 550 based on the monitor 540 receiving signals from the trench depth sensor implements 100 described herein associated with each row unit. The monitor 540 may store and time-stamp the depth measurements (the "measured depth") at each row unit. The monitor 540 may display an image correlated to the measured depth on a map at a map location corresponding to the GPS position of the planter at the time of the depth measurements. For example, in some embodiments the monitor 540 displays a legend correlating colors to ranges of depth. In some such embodiments, the depth range less than zero is correlated to a single color while a set of depth ranges greater than zero are correlated to a set of colors such that the color intensity increases with depth.

Figure 17:
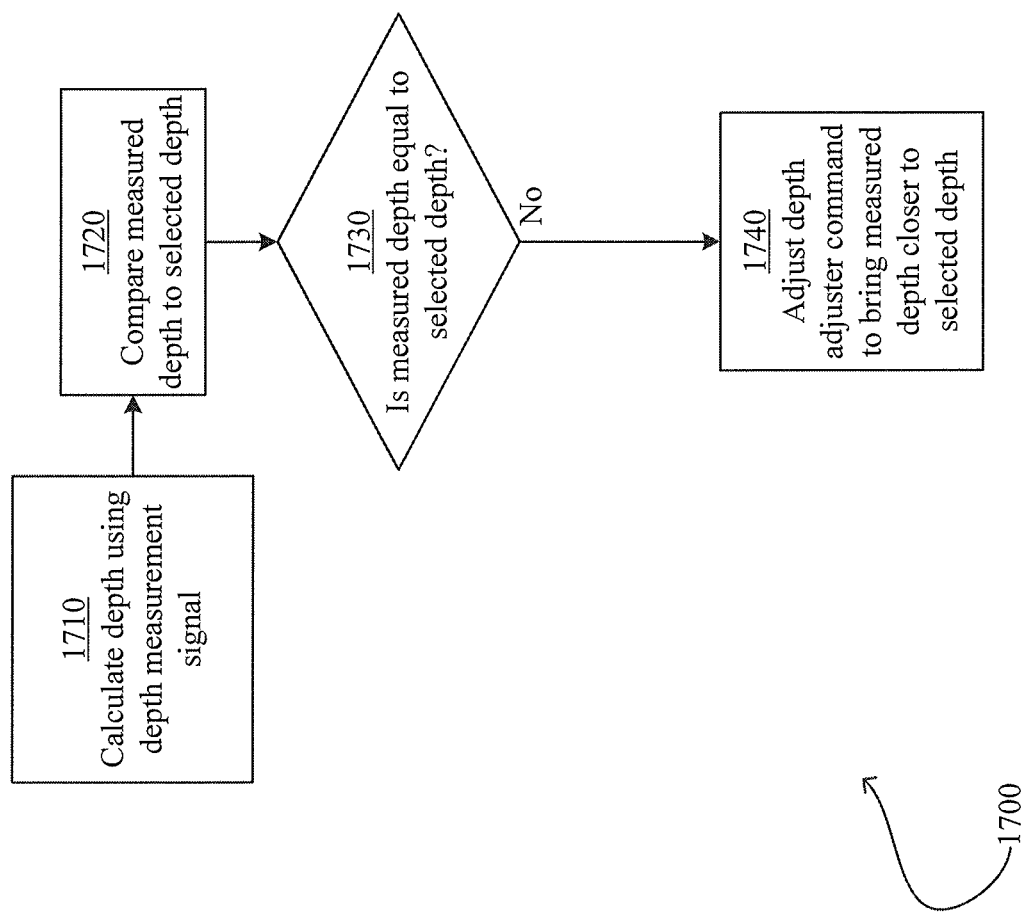
FIG. 17 illustrates a process for controlling trench depth.

FIG. 17 illustrates a process 1700 for controlling depth based on the signal generated by one of the trench depth sensor implements 100 described above. At step 1710, the monitor 540 preferably estimates the depth of the trench 3 based on the signal generated by the trench depth sensor implement 100. At step 1720, the monitor 540 preferably compares the measured depth to a selected depth entered by the user or previously stored in memory. Alternatively, the selected depth may be selected using the methods disclosed in U.S. Publication No. US2016/0037709, incorporated herein in its entirety by reference. If at step 1730 the measured depth is not equal to or within a threshold range (e.g., 5%) of the selected depth, then at step 1740 the monitor 540 preferably sends a command signal to the depth adjuster 90 in order to bring the measured depth closer to the selected depth; for example, if the measured depth is shallower than the selected depth, then the monitor 540 preferably commands the depth adjuster to rotate the depth adjustment assembly 90 in order to increase the trench depth.

Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the scope of the appended claims.

The invention claimed is:

1. An agricultural implement comprising:
an implement frame;
a trench opener configured to open a soil trench in a soil surface;
a gauge wheel arm pivotally mounted to said implement frame and disposed to limit a depth of said soil trench opened by said trench opener, said gauge wheel arm having a range of motion;
a depth adjustment assembly configured to modify said depth of said soil trench by controlling movement of said gauge wheel arm, said depth adjustment assembly having a range of motion;
a depth adjustment body disposed between said depth adjustment assembly and said gauge wheel arm, said depth adjustment body having a range of motion; and
an accelerometer having an x-axis, a y-axis and a z-axis, said accelerometer disposed on a device comprising at least one of said depth adjustment assembly, said gauge wheel arm, and said depth adjustment body, said accelerometer configured to detect a position of said device, and wherein said accelerometer is disposed on said device such that none of the x-axis, y-axis and z-axis of said accelerometer are perpendicular to the soil surface traversed by the agricultural implement across the entire range of motion of said device.

2. The agricultural implement of claim 1, wherein said accelerometer is disposed on said depth adjustment assembly.

3. The agricultural implement of claim 1, wherein said accelerometer is disposed on said first gauge wheel arm.

4. The agricultural implement as claimed in claim 1, wherein said accelerometer is disposed on said depth adjustment body.

5. The agricultural implement of claim 1, wherein the depth adjustment assembly is configured to automatically modify the depth of the trench based on a depth measured by the accelerometer.

6. The agricultural implement of claim 2, wherein the depth adjustment assembly is configured to automatically modify the depth of the trench based on a depth measured by the accelerometer.

7. The agricultural implement of claim 3, wherein the depth adjustment assembly is configured to automatically modify the depth of the trench based on a depth measured by the accelerometer.

8. The agricultural implement of claim 4, wherein the depth adjustment assembly is configured to automatically modify the depth of the trench based on a depth measured by the accelerometer.

* * * * *